US012530353B2

(12) United States Patent
Plehn-Dujowich et al.

(10) Patent No.: US 12,530,353 B2
(45) Date of Patent: Jan. 20, 2026

(54) DOMAIN-SPECIFIC SYSTEM AND METHOD FOR ENHANCING FIRMOGRAPHIC SEARCH THROUGH QUERY UNDERSTANDING AND EXPANSION

(71) Applicants: Jose Plehn-Dujowich, Orange County, CA (US); Mainak Sarkar, Irvine, CA (US); Shyam Sunder Peri, Secunderabad (IN)

(72) Inventors: Jose Plehn-Dujowich, Orange County, CA (US); Mainak Sarkar, Irvine, CA (US); Shyam Sunder Peri, Secunderabad (IN)

(73) Assignee: BRIGHTQUERY INC., Irvine, CA (US)

( * ) Notice: Subject to any disclaimer, the term of this patent is extended or adjusted under 35 U.S.C. 154(b) by 0 days.

(21) Appl. No.: 18/954,755

(22) Filed: Nov. 21, 2024

(65) Prior Publication Data

US 2025/0173337 A1   May 29, 2025

Related U.S. Application Data

(60) Provisional application No. 63/602,402, filed on Nov. 23, 2023.

(51) Int. Cl.
*G06F 16/2453*   (2019.01)
(52) U.S. Cl.
CPC .............................. *G06F 16/24542* (2019.01)

(58) Field of Classification Search
CPC .................... G06F 16/24542; G06F 16/24522
See application file for complete search history.

(56) References Cited

U.S. PATENT DOCUMENTS

| | | | |
|---|---|---|---|
| 11,783,131 B2* | 10/2023 | Yuan | G06N 20/00 704/9 |
| 2022/0318831 A1* | 10/2022 | Marvaniya | G06F 16/9537 |
| 2024/0241752 A1* | 7/2024 | Crabtree | G06Q 10/067 |
| 2025/0190460 A1* | 6/2025 | Madisetti | G06F 40/30 |

* cited by examiner

*Primary Examiner* — Dangelino N Gortayo

(57) ABSTRACT

Domain-specific system and method for enhancing firmographic search through query understanding and expansion presents an innovative approach to revolutionizing firmographic search processes. This system employs advanced domain-specific query understanding and expansion techniques to bridge the gap between natural language queries and structured firmographic data, significantly improving precision and relevance in search results. This method utilizes a multi-model approach to dissect natural language queries into named entities, subsequently mapping them to specific structured attributes within a database. This refined query understanding enhances the alignment of unstructured queries with the structured format required for accurate data retrieval. The system also introduces custom confidence scoring to assess the reliability of model outputs, further improving the accuracy of structured query formulation. The presented system stands as a pioneering advancement in enhancing the firmographic search experience, catering to diverse user needs in the ever-evolving domain of business data retrieval.

18 Claims, 16 Drawing Sheets

1000

+ New Chat

Older
Company Income Statements Analysis: Microsof...

Top 10 Electrical Contractors in San Francisco by...

Investable Companies in San Francisco, CA...

Top 10 Electrical Contractors in San Francisco by Revenue

🙂 You
List the top 10 electrical Contractors in SF, CA by revenue ← 1002

🤖 BrightQuery AI
There are a total of 654 Electrical Contractors in San Francisco, California, Here are the top 10 firms sorted by revenue. ← 1004

Top Electrical Contractors in San Francisco, California

| BQID ⇅ | Company Name | EIN ⇅ | Ticker ⇅ | City ⇅ |
|---|---|---|---|---|
| 100024591666 | DECKER ELECTRIC CO. INC, ELECTRICAL CONTRACTORS | NA | NA | San Francisco |
| 100070055336 | SKYLINE CONSTRUCTION | NA | NA | San Francisco |
| 100003524000 | GEI, INC | 591608266 | NA | San Francisco |
| 100006807378 | ECOPLEXUS, INC | NA | NA | San Francisco |
| 100009476798 | WEAVE GRID, INC | 832785785 | NA | San Francisco |
| 100005595440 | MCMILLAN ELECTRIC | 941729373 | NA | San Francisco |
| 100055322820 | SCHMITT HEATING CO. INC | 943307435 | NA | San Francisco |
| 100048669148 | PAGANINI ELECTRIC CORPORATION | 942277299 | NA | San Francisco |
| 100001539200 | CBF, INC. | 942379973 | NA | San Francisco |
| 100005681279 | METROPOLITAN ELECTRICAL CONSTRUCTION, INC. | 942712453 | NA | San Francisco |
| 100067087767 | YOUNG ELECTRIC CO. | 942580901 | NA | San Francisco |
| 100019841669 | CAPITOL ELECTRIC CONSTRUCTION COMPANY | 942600561 | NA | San Francisco |
| 100002234786 | CREATIVEE SYSTEMS, LLC | 463959034 | NA | San Francisco |
| 100068207840 | DECKER ELECTRIC COMPANY, INC. | 940423210 | NA | San Francisco |
| 100014766572 | PHOENIX ELECTRIC COMPANY | 710900458 | NA | San Francisco |
| 100014766572 | ARD MAC ELECTRIC, INC. | 462341128 | NA | San Francisco |
| 100005299258 | LOGAN INVESTMENTS, INC | NA | NA | San Francisco |
| 100043503706 | MCMILLAN DATA COMMUNICATIONS, INC. | 263708357 | NA | San Francisco |
| 100005623339 | MCCLURE ELECTRIC, INC. | 941632067 | NA | San Francisco |

⤓ EXPORT DATA ← 1006

Enter your question here

⊙ Read the BQ Docs
⚙ Settings

Chat Context

Chat Type
(General Query)

Data Sources
(BrightQuery Database)

Custom User Instructions
Please enter here any custom instructions you may have for BQ AI User Documents
📄 Meeting_Notes_CVS.docx (Upload more files)

DOMAIN-SPECIFIC SYSTEM AND METHOD FOR ENHANCING FIRMOGRAPHIC SEARCH THROUGH QUERY UNDERSTANDING AND EXPANSION

CROSS-REFERENCE TO RELATED APPLICATIONS

This patent application claims priority benefit of U.S. Provisional Patent Application No: 63/602,402, entitled "DOMAIN-SPECIFIC SYSTEM AND METHOD FOR ENHANCING FIRMOGRAPHIC SEARCH THROUGH QUERY UNDERSTANDING AND EXPANSION", filed on Nov. 23, 2023. The entire contents of the patent application is hereby incorporated by reference herein in its entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a domain-specific system and method for enhancing firmographic search through query understanding and expansion. More particularly, the present disclosure introduces a multi-model approach to decompose natural language queries into named entities, which are then mapped to specific, structured attributes within a database.

BACKGROUND

Firmographic search refers to the process of retrieving specific business-related data from a database or repository. Users often express their queries in natural language when searching for firmographic information. However, the challenge arises when these natural language queries lack the structured format necessary to retrieve precise and relevant data from a domain-specific database or structured database. The discrepancy between unstructured user queries and structured database attributes can lead to less accurate search results, hampering users' ability to efficiently obtain the required firmographic information.

Traditional firmographic search systems have commonly relied on global attribute search or predefined attribute sets, which can be less user-friendly and intuitive. This lack of an effective mechanism to understand and refine natural language queries to match domain-specific attributes in a database has been a notable limitation. To address this limitation, the invention under consideration introduces a multi-model approach designed to decipher natural language queries, map them to domain-specific attributes, and retrieve accurate data from the database.

Among the known solutions to the firmographic search challenge, one prevalent approach involves the use of global attribute search mechanisms, where users must specify attributes and values in a structured manner to execute a search. However, this approach exhibits drawbacks, as it lacks the intuitiveness and flexibility inherent in natural language processing, making it cumbersome for users who may not be familiar with the exact attributes or structured query format.

Another approach is the utilization of predefined attribute sets, where some systems offer users a selection of predefined attributes for common queries. While this approach provides some level of structure, it also poses limitations, as the rigid nature of predefined attribute sets restricts the scope of queries and may not accommodate the diverse firmographic information needs of various users.

The drawbacks of these known solutions are manifold. Firstly, they lack the intuitiveness and ease of use associated with natural language-based queries, requiring users to possess prior knowledge of the structured query format or the exact attributes. Additionally, they may not have robust mechanisms to refine and structure natural language queries to match domain-specific attributes in the database. Furthermore, basic NLP solutions and keyword-based searches frequently fall short in comprehending domain-specific nuances, resulting in less accurate and relevant search results. Moreover, as the volume and diversity of firmographic data increase, traditional solutions may struggle to scale and maintain performance, especially in real-time search scenarios. Without the ability to accurately comprehend and map natural language queries to structured attributes, the precision and relevance of search results are often compromised.

In the light of the aforementioned discussion, there exists a pressing need for a novel and advanced solution to the identified technical problem. This solution should effectively bridge the gap between natural language queries and structured database attributes in the domain of firmographic search, offering an intuitive, precise, and relevant search experience for users.

SUMMARY

The following invention presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards a system and method for enhancing firmographic search through query understanding and expansion.

Another objective of the present disclosure is to enable multiple models to work concurrently and independently, effectively tagging and classifying entities within the query.

Another objective of the present disclosure is to achieve precision and relevance. The invention aims to bridge the gap between natural language queries posed by users and the structured firmographic data residing in a database. By doing so, it seeks to provide users with more accurate and pertinent search outcomes, thereby improving the overall search experience.

Another objective of the present disclosure is to formulate a structured query based on the aggregated outputs from all models and the compiled confidence scores. This structured query is specifically tailored to extract relevant firmographic data from the database. The objective is to create a query that effectively retrieves the required information with precision and speed.

Another objective of the present disclosure is to advance domain-specific entity recognition. This entails the development of specialized models and techniques that excel in identifying and categorizing domain-specific entities within natural language queries. Unlike generic Natural Language Processing (NLP) solutions, which may struggle to discern domain nuances, this objective is aimed at enhancing the system's ability to accurately recognize and classify specific entities relevant to the firmographic context. By achieving domain-specific entity recognition, the invention ensures a more precise and context-aware interpretation of user queries, ultimately leading to more accurate and relevant search results.

Another objective of the present disclosure is to efficiently activate relevant models based on a comprehensive analysis of the user query. This entails the development of an intelligent gating strategy that dynamically selects and triggers specialized models tailored to different facets of the query. By employing this dynamic model activation approach, the invention aims to optimize the utilization of available resources and processing power. The objective is to ensure that each facet of the user query, such as organization names, industry types, geographic locations, executive names, and other firmographic attributes, is processed by the most suitable model. This not only enhances the system's efficiency but also contributes to the overall accuracy and effectiveness of query understanding and result retrieval in firmographic search scenarios.

Another objective of the present disclosure is to significantly enhance real-time search capabilities. This objective revolves around improving the system's ability to deliver prompt and up-to-date search results as users interact with it. To achieve this, the invention implements several optimizations, including the concurrent processing of specialized models and the establishment of streamlined interactions with the database. The goal is to ensure that users receive search results swiftly and accurately, even in dynamic and rapidly evolving firmographic contexts. By enhancing real-time search capabilities, the invention aims to provide users with a responsive and efficient search experience, facilitating quick access to the most relevant firmographic information, and ultimately elevating the overall usability of the system.

Another objective of the present disclosure is to implement a custom confidence scoring mechanism. This mechanism serves the purpose of offering a quantifiable measure of reliability for each model's output within the system. The objective is to establish a robust system that not only produces structured queries but also provides insights into the accuracy and trustworthiness of these queries. By assigning confidence scores to each model's contributions, the invention aims to assist users and system operators in gauging the reliability of the information retrieved. This facilitates the discernment of accurate and dependable results, ensuring that users can have confidence in the derived structured queries and the corresponding firmographic data retrieved. The custom confidence scoring mechanism represents a vital component in enhancing the overall trustworthiness and usability of the system.

Another objective of the present disclosure is to prioritize scalability. The underlying architecture of the system has been purposefully designed to accommodate the increasing volume and diversity of firmographic data over time. This objective is driven by the need to maintain consistent and reliable system performance as the complexity and breadth of available data expand. The system aims to effortlessly adapt to the evolving landscape of firmographic information, ensuring that it can handle large datasets, diverse data types, and real-time updates with efficiency. By achieving scalability, the invention aims to future-proof its capabilities, guaranteeing that it can continually deliver optimal performance even in the face of growing data demands. Scalability is a key facet of ensuring the longevity and effectiveness of the firmographic search system.

Another objective of the present disclosure is to prioritize providing a user-friendly experience. Central to this objective is the system's capability to enable users to express their queries in a natural language format, thereby simplifying and enhancing the overall search process. The intention is to create an intuitive and user-friendly environment in contrast to rigidly structured query formats. By allowing users to interact with the system in a manner that mirrors their everyday language, the invention fosters a more approachable and accessible firmographic search experience. This user-friendly approach not only reduces the learning curve for users but also encourages greater user engagement and adoption, ultimately contributing to a more effective and satisfying search journey.

Another objective of the present disclosure is to emphasize the importance of continuous improvement. The system is intentionally constructed with an inherent commitment to ongoing enhancement. This objective is anchored in the concept of establishing feedback loops and facilitating model re-training as integral components of the system's functionality. The aim is to foster an environment where the system evolves and improves over time. By actively collecting user feedback and employing iterative model re-training, the invention endeavors to enhance the performance and accuracy of its models as it adapts to changing user needs and the evolving landscape of firmographic data. The commitment to continuous improvement ensures that the system remains not only up-to-date but also adaptable and responsive, thus maintaining its relevance and effectiveness in the long term.

Another objective of the present disclosure is to underscore the significance of robust error handling. This objective is centered on the implementation of fail-safe mechanisms and meticulous error-handling procedures designed to guarantee a seamless and uninterrupted user experience, even when confronted with unforeseen queries or system anomalies. The intention is to create a resilient and user-centric system that can gracefully handle unexpected situations, ensuring that users can continue to interact with the system without disruption.

Another objective of the present disclosure is to emphasize the importance of seamless integration with databases. This objective revolves around the creation of a tightly integrated system that operates harmoniously with databases. The primary aim is to ensure that the refined structured queries generated by the system are seamlessly and accurately translated into database queries. The overarching objective is to facilitate efficient and precise data retrieval from the database. By achieving seamless integration, the invention aims to eliminate any friction or discrepancies in the data retrieval process, thus optimizing the user's ability to access relevant firmographic information swiftly and accurately. This integration not only streamlines the search process but also contributes to the overall effectiveness and utility of the system.

In an exemplary aspect of the present disclosure, specialized models are intricately crafted to excel in the identification and categorization of domain-specific entities. This represents a noteworthy stride forward when compared to generic Natural Language Processing (NLP) solutions, which may unintentionally disregard the subtleties and specific characteristics inherent to particular domains. These specialized models are tailored to discern and classify entities that are highly relevant within the firmographic domain, offering a level of precision and context awareness that generic NLP solutions typically lack. This enhancement ensures that the system can more accurately interpret and respond to user queries, ultimately resulting in more precise and relevant search results.

An exemplary aspect of the present disclosure includes the implementation of a multi-model approach aimed at achieving a deeper understanding of natural language queries. This approach involves the systematic analysis and tagging of various firmographic attributes within queries, resulting in a substantial improvement in query comprehension compared to basic Natural Language Processing (NLP) or keyword-based search systems.

An exemplary aspect of the present disclosure involves the utilization of specialized models to comprehensively analyze various facets of a user's natural language query. These facets encompass a wide array of firmographic attributes, spanning elements such as organization names, industry types, geographic locations, executive names, and various other specific firmographic attributes.

An exemplary aspect of the present disclosure involves the accurate mapping of named entities within a query to structured attributes residing in the database. This meticulous process is designed to enhance the precision and relevance of search results, ultimately ensuring that users can locate the precise firmographic information they seek.

An exemplary aspect of the present disclosure involves the concurrent processing of models and optimized interaction with the database, with the primary aim of ensuring real-time response. This strategic approach enhances the user experience by delivering search results that are not only quick but also highly accurate, thereby elevating the overall quality of the search experience.

An exemplary aspect of the present disclosure involves the evaluation of the reliability and accuracy of the tags and classifications provided by each specialized model. This evaluation process ensures that the system assesses the confidence levels associated with each model's task, ultimately contributing to the overall precision and accuracy of the structured query formulation.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 10 is a diagram depicting the main screen of the query processing engine application, illustrating the presentation of firmographic search results, implemented in accordance with one or more non-limiting exemplary functional scenarios.

FIG. 12 is a diagram depicting the result screen of the query processing engine application, implemented in accordance with one or more non-limiting exemplary functional scenarios.

FIG. 13 is a diagram depicting the insights screen of the query processing engine application, implemented in accordance with one or more non-limiting exemplary functional scenarios.

Figure 1:
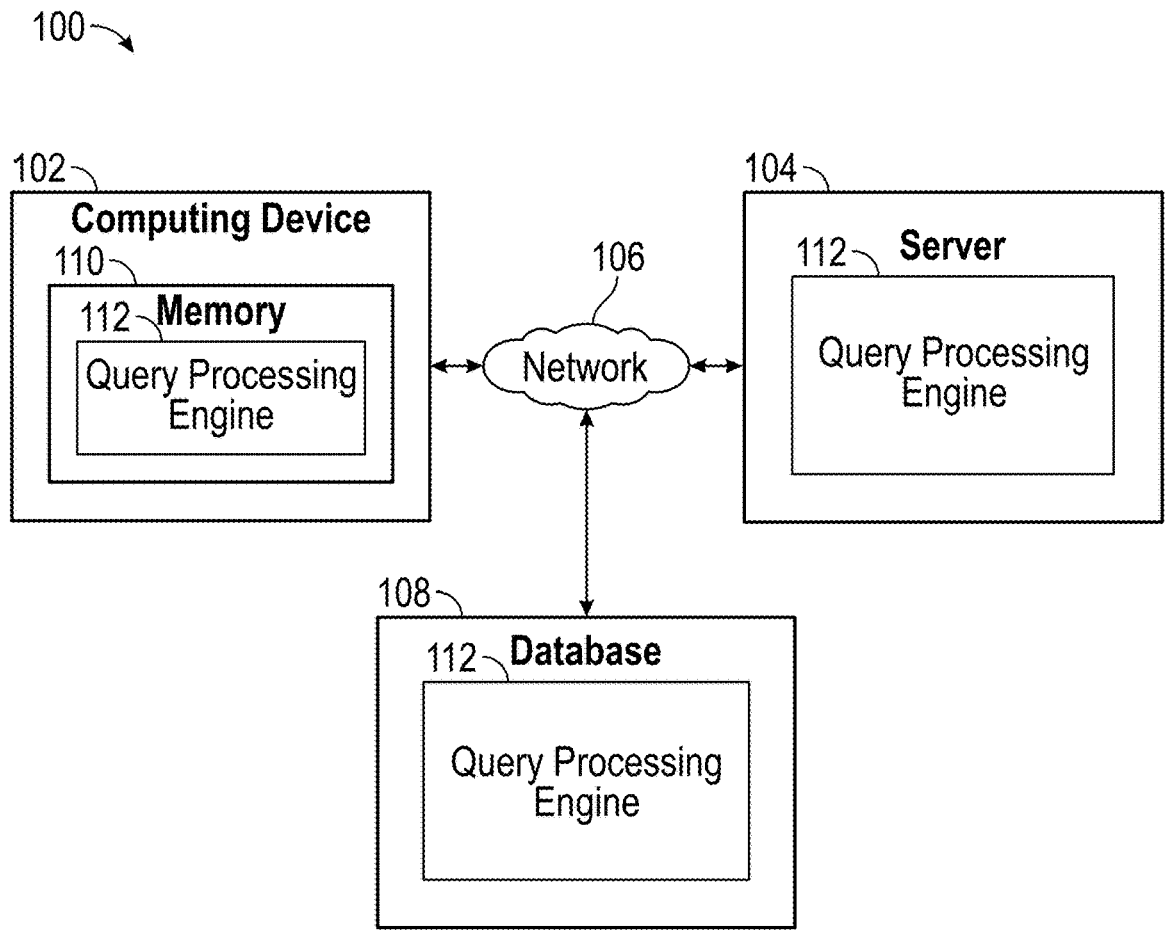
FIG. 1 is a block diagram that provides a schematic representation of an exemplary system designed to illustrate the architecture and components involved in enhancing firmographic search through advanced query understanding and expansion, in accordance with one or more exemplary embodiments.

Furthermore, the objects and advantages of this invention will become apparent from the following description and the accompanying annexed drawings.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1, block diagram 100 provides a schematic representation of an exemplary system designed to illustrate the architecture and components involved in enhancing firmographic search through advanced query understanding and expansion. At the center of this schematic representation is the overall image labeled as 100, symbolizing a holistic view of the entire system. Surrounding this central image, various interconnected components play pivotal roles in enabling this advanced search capability.

The computing device labeled as 102 represents the user's interface, which may consist of devices like desktop computers, laptops, or mobile devices, through which firmographic search queries are initiated. Adjacent to it is the server labeled as 104, which may serve as the core processing unit of the system. The server may handle computational tasks, including query analysis, model activation, data retrieval, and result presentation. It acts as an intermediary between the user's computing device 102 and the database 108.

Facilitating communication between the user's computing device 102 and the server 104 is the network labeled as 106. This network 106 may enable seamless data and query transmission, employing various communication protocols to ensure efficient data transfer. The network 106 component, as depicted in FIG. 1, represents a crucial element of the exemplary system's architecture. It may encompass a wide range of network types and technologies, including but not limited to local area networks (LANs), wide area networks (WANs), wireless networks, and the Internet. The network 106 plays a pivotal role in facilitating seamless communication between the user's computing device 102 and the central server 104. It may employ various communication protocols and technologies, such as Ethernet, Wi-Fi, cellular networks, or optical fiber connections, to ensure efficient data transmission. Whether it's a LAN within an organizational setting or a global internet connection, the network component is instrumental in enabling users to initiate firmographic search queries and receive timely and accurate responses from the system, thereby contributing to an enhanced search experience.

The database is labeled as 108, representing a structured repository where firmographic data may be stored. The database 108 may house a wealth of information about businesses and organizations. The server 104 may interact with this database 108 to retrieve relevant information in response to user queries. The database 108, as illustrated in FIG. 1, represents a fundamental cornerstone of the exemplary system's architecture, encompassing a broad spectrum of database types, including structured and unstructured databases. It serves as the repository for firmographic data, housing a wealth of information about businesses and organizations. In structured databases, data may be organized into well-defined tables and fields, whereas unstructured databases may store data in a more flexible and varied format, such as documents or multimedia files. The database component may utilize advanced data management systems, including relational database management systems (RDBMS), NoSQL databases, or document stores, to efficiently store and retrieve firmographic information. Regardless of its structure, the database plays a pivotal role in responding to user queries by providing access to accurate and relevant data. This essential component ensures that the system can deliver precise and timely firmographic search results, enhancing the overall user experience.

The memory component, labeled as 110, represents the memory resources within the user's computing device 102. This memory 110 is utilized to store essential components of the system, including the query processing engine 112. It plays a crucial role in ensuring that the computing device 102 has the necessary resources and storage capacity to efficiently execute the query processing engine 112 and related functionalities. The memory 110 may include various types, such as RAM (Random Access Memory) and storage devices like hard drives or solid-state drives, depending on the computing device's 102 configuration. This memory allocation ensures quick access to the query processing engine and other essential data, contributing to the system's responsiveness and overall effectiveness in enhancing firmographic search.

At the core of the system is the query processing engine labeled as 112. This engine may represent the central component responsible for orchestrating the entire process of enhancing firmographic search. It may encompass various functional modules and algorithms designed to understand and expand natural language queries, activate specialized models, compile outputs, and interact with the database for data retrieval.

Figure 2:
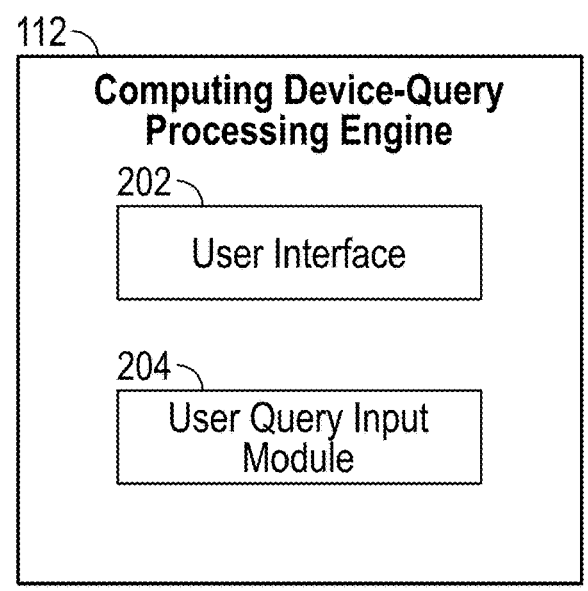
FIG. 2 is a block diagram depicting the user-side functional modules of the query processing engine in greater detail as shown in FIG. 1, in accordance with one or more exemplary embodiments.

Referring to FIG. 2, a block diagram 200 provides a detailed depiction of the user-side functional modules of the query processing engine 112, as presented in FIG. 1. This diagram delves into the components responsible for user interaction and query initiation, emphasizing the user interface 202 and input modules. The Computing Device— Query Processing Engine labeled as 112 symbolizes the user's computing device, equipped with the query processing engine. This computing device may take various forms, such as desktop computers, laptops, or mobile devices, each serving as a conduit for the user's interaction with the system.

The user interface is labeled as 202, providing a sophisticated platform for user interaction. This versatile interface, which may manifest as a web-based application, software program, or mobile app, offers users an intuitive and visually appealing environment to input and manage their firmographic search queries. Within the user interface 202, the User Query Input Module labeled as 204 plays a pivotal role. This module serves as the initial point of contact for users, accepting and processing their natural language queries. Users may type or speak their queries, and the module transmits these inputs to the Query Processing Engine for further analysis.

The Query Processing Engine 112, an essential component residing on the computing device 102, processes user queries comprehensively. The User Interface 202 not only serves as a gateway for query input but also as a conduit for receiving and presenting the refined query understanding and expanded results generated by the Query Processing Engine 112.

Figure 3A:
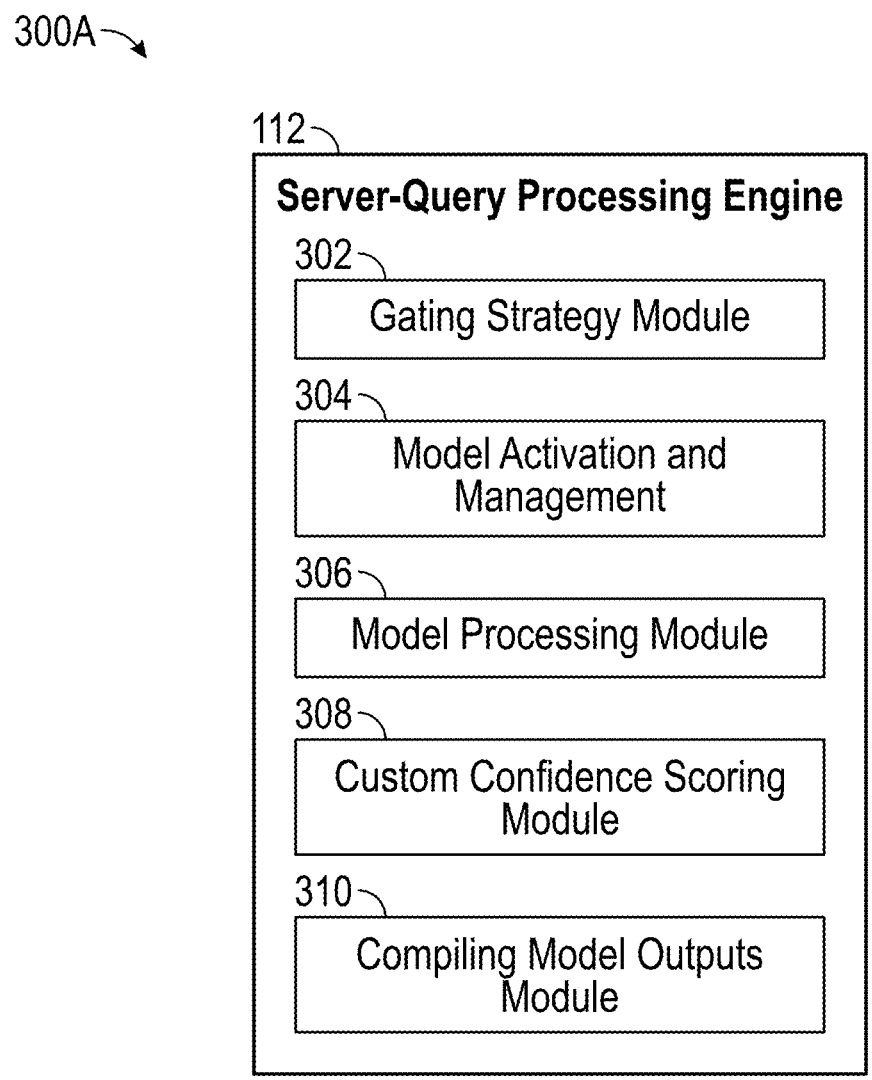
FIG. 3A is a block diagram depicting the server-side functional modules of the query processing engine in greater detail as shown in FIG. 1, in accordance with one or more exemplary embodiments.

Referring to FIG. 3A, a block diagram 300A may provide an illustrative overview of the server-side functional modules within the query processing engine, as previously presented in FIG. 1. This diagram may offer an intricate view of the components that potentially contribute to query analysis and processing, emphasizing the significant role of server-side functionalities. The Server—Query Processing Engine, labeled as 112, symbolizes the server 104 where the query processing engine 112 resides. This server 104, potentially equipped with the necessary software components, may act as the computational hub responsible for driving the query understanding and expansion process.

The Gating Strategy Module labeled as 302, may represent the initial stage of query analysis. The Gating Strategy Module 302 may potentially perform several vital functions, such as analyzing user queries by breaking them down into identifiable tokens. It may identify domain-specific keywords within the queries, assess the context surrounding the queries, and recognize named entities embedded within them. Additionally, it may employ domain-specific heuristics to refine the strategy for activating specialized models.

The Model Activation and Management module, labeled as 304, may take charge of model deployment and coordination based on the instructions generated by the gating strategy. This module may potentially play a crucial role in ensuring that specialized models are activated efficiently to process user queries effectively. The Model Processing Module, labeled as 306, may operate independently to process user queries using the activated specialized models. This module may excel at tagging and classifying entities within the queries, leveraging their domain-specific expertise to enhance query understanding and relevance.

The Custom Confidence Scoring Module, labeled as 308, may be responsible for assessing the reliability and accuracy of the output produced by each specialized model. It may compute confidence scores using domain-specific scoring methodologies, thus potentially providing a measure of the reliability of the model outputs. The Compiling Model Outputs Module, labeled as 310, may collect and compile the outputs generated by the activated specialized models on the server 104 side. This module may prepare the compiled outputs for further processing or aggregation, as required.

Figure 3B:
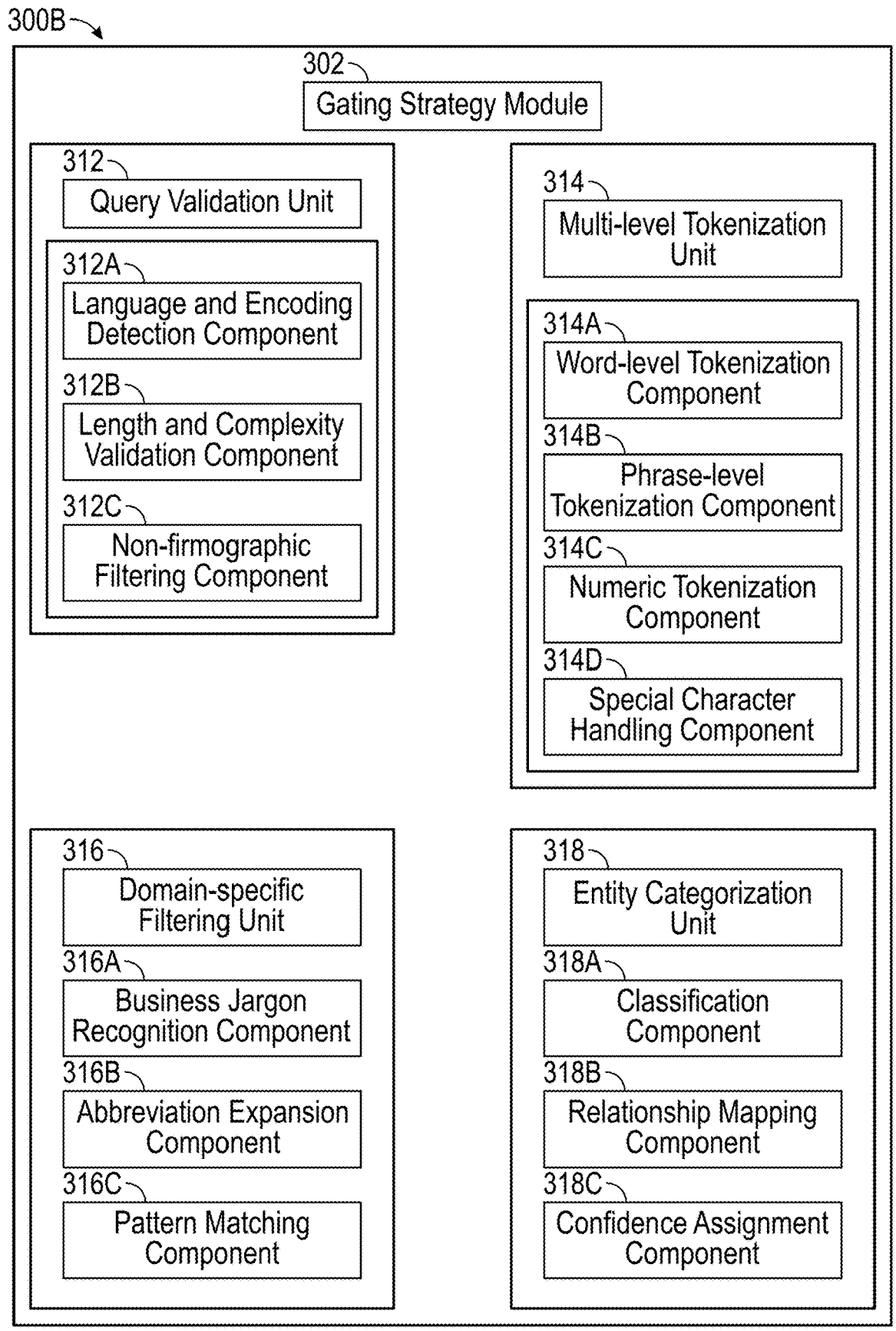
FIG. 3B is a block diagram illustrating the detailed submodules of the Gating Strategy Module (302), as depicted in FIG. 3A, in accordance with one or more exemplary embodiments.

Referring to FIG. 3B, it is a block diagram illustrating the detailed submodules of the Gating Strategy Module (302), as depicted in FIG. 3A, in accordance with one or more exemplary embodiments. The Gating Strategy Module (302) may be responsible for performing query analysis, decomposition, and filtering to enhance the understanding of user queries and prepare them for subsequent processing by other components of the system. The Gating Strategy Module (302) may include four key submodules: the Query Validation Unit (312), the Multi-level Tokenization Unit (314), the Domain-specific Filtering Unit (316), and the Entity Categorization Unit (318), each with specialized components for their respective functionalities.

The Query Validation Unit (312) may focus on ensuring that the received queries are valid and relevant to the domain by performing multiple checks. It may include the Language and Encoding Detection Component (312A), which may identify the language and validate the encoding of the query to ensure proper handling of text formats. The Length and Complexity Validation Component (312B) may evaluate the size constraints and structural complexity of queries, ensuring they fall within acceptable limits for processing. Additionally, the Non-firmographic Filtering Component (312C) may filter out irrelevant or non-business-related elements from the query, ensuring that only relevant components are retained for further analysis.

The Multi-level Tokenization Unit (314) may be responsible for breaking down the validated queries into meaningful tokens. This unit may include the Word-level Tokenization Component (314A), which may segment queries into individual words for basic text processing. The Phrase-level Tokenization Component (314B) may identify and segment compound business terms or multi-word expressions commonly used in firmographic contexts. The Numeric Tokenization Component (314C) may extract and process numerical data elements, such as revenue or employee counts, while the Special Character Handling Component (314D) may address the proper handling and processing of business-specific special characters and symbols.

The Domain-specific Filtering Unit (316) may refine the tokenized queries by applying domain-specific criteria. This unit may include the Business Jargon Recognition Component (316A), which may identify and validate industry-specific terminology. The Abbreviation Expansion Component (316B) may process and expand abbreviated terms, converting them into their full forms for better clarity. Additionally, the Pattern Matching Component (316C) may detect and validate specific patterns or formats, such as email addresses, phone numbers, or standardized codes, ensuring accurate interpretation.

The Entity Categorization Unit (318) may focus on categorizing and assigning meaning to the refined query elements. It may include the Classification Component (318A), which may assign predefined categories to identified entities based on the query context. The Relationship Mapping Component (318B) may establish meaningful connections between the categorized entities, such as linking an organization to its location or industry. Finally, the Confidence Assignment Component (318C) may compute reliability scores for the categorized entities, enabling the system to assess the trustworthiness of the results before passing them to downstream modules.

The Gating Strategy Module (302), as depicted in FIG. 3B, may also include additional processing capabilities that enhance its functionality. These capabilities may be facilitated by the Entity Categorization Unit (318), which includes the Classification Component, the Relationship Mapping Component, and a confidence scoring mechanism.

These processes may collectively refine the analysis of query elements to improve the precision and relevance of results.

The Classification Component within the Entity Categorization Unit (318) may be configured to assign specific classifications to entities identified within the query. These classifications may include categorizing companies based on their primary business activities, their associated products, or the customer segments they serve. This process may enable the system to align query entities with predefined categories, ensuring consistency and facilitating downstream analysis. The Relationship Mapping Component, also part of the Entity Categorization Unit (318), may establish meaningful connections between categorized entities. This mapping process may encompass various types of relationships, including company-to-company relationships, geographic associations, and market-specific interactions. By defining these relationships, the system may provide a contextual understanding of how entities are interlinked, contributing to more nuanced query interpretations.

Following the classification and relationship mapping processes, the system may implement a confidence scoring mechanism to evaluate the reliability and accuracy of the categorized and mapped entities. This scoring may consider all the parameters processed within the Entity Categorization Unit, including classification and relationship mapping outcomes. A threshold mechanism may be applied to these confidence scores to rank the results, ensuring that only the most relevant and high-confidence matches are presented to the user. Together, these advanced processing capabilities of the Gating Strategy Module (302), in continuation with the detailed submodules depicted in FIG. 3B, may enable the system to provide precise and high-quality firmographic search results, enhancing its effectiveness and utility for complex query processing scenarios.

Figure 3C:
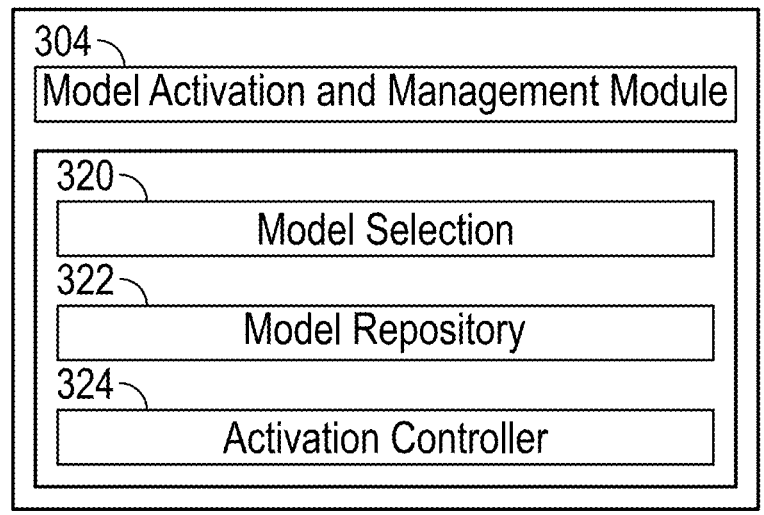
FIG. 3C is a block diagram illustrating the detailed submodules of the Model Activation and Management Module (304), as depicted in FIG. 3A, in accordance with one or more exemplary embodiments.

Referring to FIG. 3C, it is a block diagram illustrating the detailed submodules of the Model Activation and Management Module (304), as depicted in FIG. 3A, in accordance with one or more exemplary embodiments. The Model Activation and Management Module (304) may be responsible for selecting, managing, and activating specialized models tailored to specific query attributes, thereby enabling efficient and contextually appropriate query processing. This module, as shown in the overall image (300C), may include three key submodules: the Model Selection Component (320), the Model Repository Component (322), and the Activation Controller Component (324), each playing a distinct role in the model management process.

The Model Selection Component (320) may be configured to identify and select the most appropriate specialized models based on the attributes of the query. This selection process may involve analyzing the characteristics of the query, such as domain-specific keywords, entity types, or geographic locations, and matching these attributes to the capabilities of the available models. By doing so, the system may ensure that only the most relevant models are activated for processing.

The Model Repository Component (322) may function as a centralized storage unit for maintaining a library of specialized models. These models may include predefined algorithms or machine learning-based frameworks designed for various firmographic analysis tasks, such as entity recognition, classification, or financial data analysis. The repository may also support version control and updates to ensure that the models remain current and effective for their intended tasks.

The Activation Controller Component (324) may be responsible for managing the activation and execution of the selected models. This component may dynamically allocate computational resources to activate the selected models and monitor their performance during the query processing phase. Additionally, the Activation Controller (324) may deactivate models that are no longer required, thereby optimizing resource utilization and ensuring efficient system operation. Together, the submodules of the Model Activation and Management Module (304), as illustrated in the overall image (300C), may enable the system to dynamically adapt to diverse query requirements by leveraging specialized models effectively, ensuring accurate and efficient query processing.

Figure 3D:
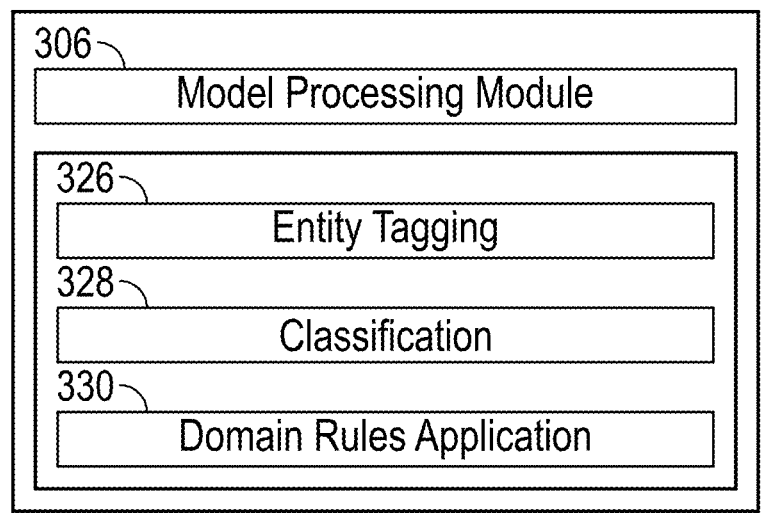
FIG. 3D is a block diagram illustrating the detailed submodules of the Model Processing Module (306), as depicted in FIG. 3A, in accordance with one or more exemplary embodiments.

Referring to FIG. 3D, it is a block diagram illustrating the detailed submodules of the Model Processing Module (306), as depicted in FIG. 3A, in accordance with one or more exemplary embodiments. The Model Processing Module (306) may be responsible for autonomously analyzing query elements by tagging entities, categorizing them, and applying domain-specific rules to refine query interpretation and accuracy. As illustrated in the overall image (300D), this module may include three key submodules: the Entity Tagging Component (326), the Classification Component (328), and the Domain Rules Application Component (330).

The Entity Tagging Component (326) may be configured to identify and tag relevant entities within the query. These entities may include organization names, geographic locations, financial data, and other domain-specific attributes. By tagging entities, the system may enable subsequent processing modules to recognize and interpret these elements accurately in the context of firmographic data.

The Classification Component (328) may assign categories to the tagged entities based on predefined domain-specific taxonomies. For example, tagged entities may be classified into categories such as industries, regions, financial metrics, or legal structures. This categorization process may ensure that the entities are organized in a manner that aligns with the database schema and facilitates downstream analysis.

The Domain Rules Application Component (330) may apply specialized rules to the tagged and categorized entities. These rules may be designed to enforce domain-specific constraints, validate relationships, and resolve ambiguities in the query interpretation process. For instance, the component may identify inconsistencies between categorized entities and query context, ensuring accurate and reliable query processing. Collectively, the submodules of the Model Processing Module (306), as depicted in the overall image (300D), may enhance the system's ability to tag, classify, and interpret query elements effectively, thereby improving the relevance and precision of the firmographic search results.

Figure 3E:
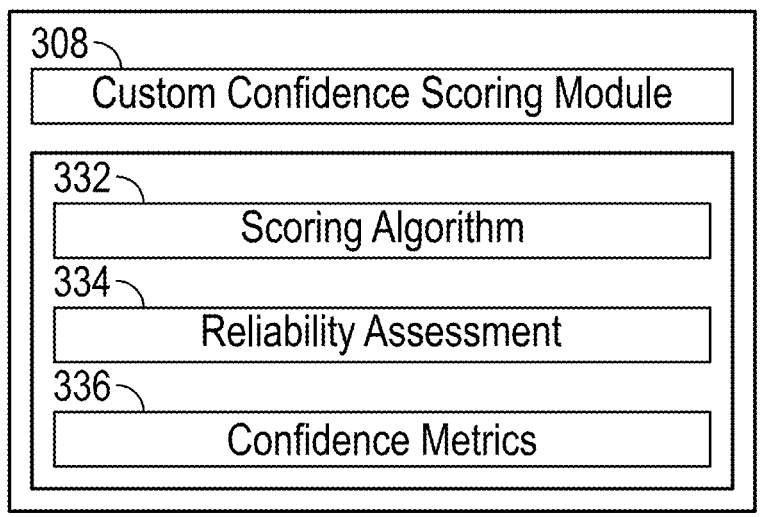
FIG. 3E is a block diagram illustrating the detailed submodules of the Custom Confidence Scoring Module (308), as depicted in FIG. 3A, in accordance with one or more exemplary embodiments.

Referring to FIG. 3E, it is a block diagram illustrating the detailed submodules of the Custom Confidence Scoring Module (308), as depicted in FIG. 3A, in accordance with one or more exemplary embodiments. The Custom Confidence Scoring Module (308) may be responsible for evaluating the outputs of activated models by computing confidence scores, assessing reliability, and generating metrics to ensure the trustworthiness of the results. As shown in the overall image (300E), this module may include three key submodules: the Scoring Algorithm Component (332), the Reliability Assessment Component (334), and the Confidence Metrics Component (336).

The Scoring Algorithm Component (332) may compute confidence scores for the outputs generated by activated models. This computation may involve applying domain-specific scoring methodologies that take into account the relevance and accuracy of model outputs based on the query attributes. By generating confidence scores, this component may help quantify the reliability of the results produced by the system. The Reliability Assessment Component (334) may evaluate the computed confidence scores to determine the overall reliability of the outputs. This component may perform validations to ensure that the confidence scores align with predefined thresholds and criteria, thereby providing an additional layer of assurance regarding the trustworthiness of the results.

The Confidence Metrics Component (336) may generate detailed metrics based on the computed confidence scores and reliability assessments. These metrics may provide insights into the accuracy, consistency, and relevance of the outputs and may serve as a critical input for subsequent modules, such as those responsible for result aggregation or query structuring. Together, the submodules of the Custom Confidence Scoring Module (308), as illustrated in the overall image (300E), may enhance the system's ability to assess and ensure the reliability of the query outputs, contributing to more precise and contextually relevant firmographic search results.

Referring to FIG. 3E, it is a block diagram illustrating the detailed submodules of the Custom Confidence Scoring Module (308), as depicted in FIG. 3A, in accordance with one or more exemplary embodiments. The Custom Confidence Scoring Module (308) may be responsible for evaluating the outputs of activated models by computing confidence scores, assessing reliability, and generating metrics to ensure the trustworthiness of the results. As shown in the overall image (300E), this module may include three key submodules: the Scoring Algorithm Component (332), the Reliability Assessment Component (334), and the Confidence Metrics Component (336).

The Scoring Algorithm Component (332) may compute confidence scores for the outputs generated by activated models. This computation may involve applying domain-specific scoring methodologies that take into account the relevance and accuracy of model outputs based on the query attributes. By generating confidence scores, this component may help quantify the reliability of the results produced by the system. The Reliability Assessment Component (334) may evaluate the computed confidence scores to determine the overall reliability of the outputs. This component may perform validations to ensure that the confidence scores align with predefined thresholds and criteria, thereby providing an additional layer of assurance regarding the trustworthiness of the results.

The Confidence Metrics Component (336) may generate detailed metrics based on the computed confidence scores and reliability assessments. These metrics may provide insights into the accuracy, consistency, and relevance of the outputs and may serve as a critical input for subsequent modules, such as those responsible for result aggregation or query structuring. Together, the submodules of the Custom Confidence Scoring Module (308), as illustrated in the overall image (300E), may enhance the system's ability to assess and ensure the reliability of the query outputs, contributing to more precise and contextually relevant firmographic search results.

Figure 3F:
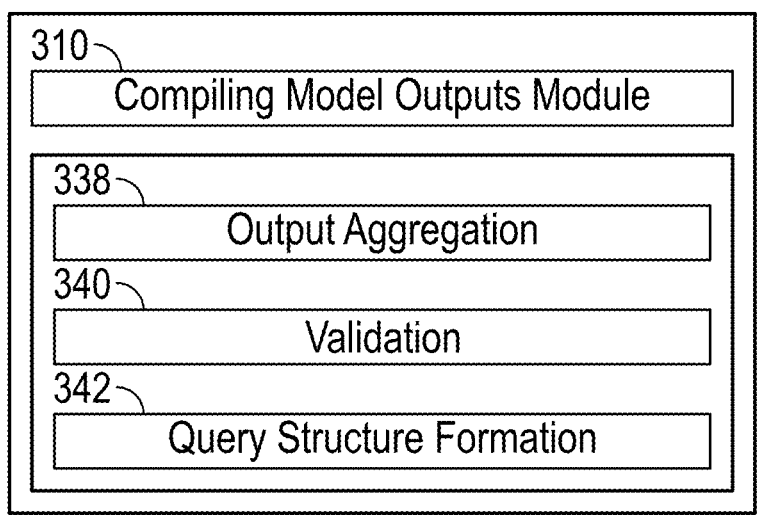
FIG. 3F is a block diagram illustrating the detailed submodules of the Compiling Model Outputs Module (310), as depicted in FIG. 3A, in accordance with one or more exemplary embodiments.

Referring to FIG. 3F, it is a block diagram illustrating the detailed submodules of the Compiling Model Outputs Module (310), as depicted in FIG. 3A, in accordance with one or more exemplary embodiments. The Compiling Model Outputs Module (310) may be responsible for aggregating outputs from activated models, validating the aggregated data, and formulating a structured query suitable for interaction with the database. As shown in the overall image (300F), this module may include three key submodules: the Output Aggregation Component (338), the Validation Component (340), and the Query Structure Formation Component (342).

The Output Aggregation Component (338) may be configured to collect and consolidate tagged outputs and confidence scores generated by the activated models. This aggregation process may organize the outputs into a unified structure, ensuring that all relevant data is available for subsequent validation and structuring. By combining the outputs, the system may ensure a comprehensive representation of the processed query elements. The Validation Component (340) may validate the aggregated outputs to ensure their consistency, accuracy, and completeness. This validation process may involve verifying the alignment of the outputs with the domain-specific rules, checking for redundancies or inconsistencies, and ensuring that the aggregated data meets the predefined criteria for quality and reliability.

The Query Structure Formation Component (342) may transform the validated outputs into a structured query format suitable for interaction with the database. This component may align the query structure with the requirements of the database, ensuring compatibility and enabling efficient data retrieval. By generating a structured query, the system may facilitate the seamless execution of the query in downstream processes. Together, the submodules of the Compiling Model Outputs Module (310), as depicted in the overall image (300F), may enable the system to aggregate, validate, and structure processed query elements effectively, thereby enhancing the precision and efficiency of the firmographic search process.

Figure 4A:
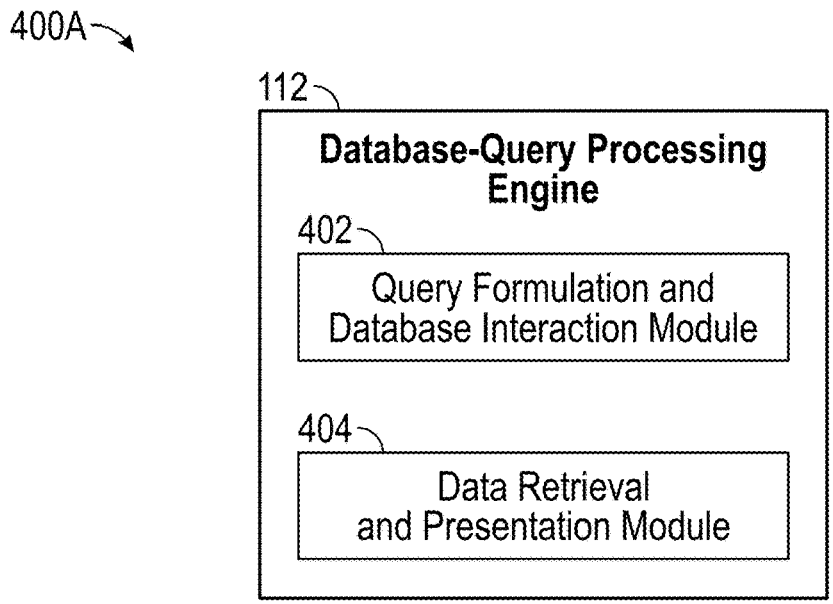
FIG. 4A is a block diagram illustrating the internal functional components of the database as introduced in FIG. 1, in accordance with one or more exemplary embodiments.

Referring to FIG. 4A, a block diagram 400A may illustrate the internal functional components of the database 108, as previously introduced in FIG. 1. This diagram provides a comprehensive view of the elements within the database's 108 internal infrastructure, shedding light on its potential contributions to the query processing engine's functionality. The Database—Query Processing Engine 112 signifies the database's integration with the query processing engine. This integration plays a pivotal role in facilitating seamless communication and data exchange between the database 108 and the query processing engine 112, which, in turn, enables critical processes of query formulation, data retrieval, and presentation.

The Query Formulation and Database Interaction Module 402 may be a pivotal element within the database's 108 internal structure. The Query Formulation and Database Interaction Module 402 may play a crucial role in formulating structured queries based on the inputs received from the query processing engine 112. Leveraging the aggregated outputs and confidence scores obtained from the Model Processing Module 306 and Custom Confidence Scoring Module 308, the Query Formulation and Database Interaction Module 402 may craft precise structured queries. These structured queries are then transmitted to the database 108 for data retrieval. This harmonious interaction between the Query Formulation and Database Interaction Module 402 and database 108 may contribute significantly to the engine's ability to retrieve specific firmographic data accurately.

The Data Retrieval and Presentation Module, labeled as 404, stands as another integral component within the database's functional framework. The Data Retrieval and Presentation Module 404 may be configured to execute structured queries within the structured or unstructured database and retrieve relevant firmographic data based on these structured queries. The Data Retrieval and Presentation Module 404 may perform this function effectively, ensuring the retrieval of pertinent data that aligns with the user's query. Subsequently, the Data Retrieval and Presentation Module 404 takes charge of presenting the retrieved data in a user-friendly format. This presentation plays a pivotal role in delivering comprehensive responses to user queries, enhancing the overall user experience.

Figure 4B:
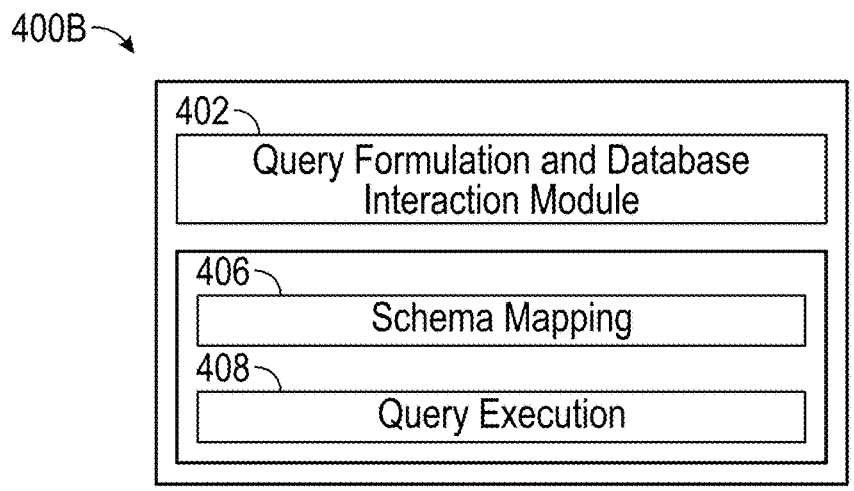
FIG. 4B is a block diagram illustrating the detailed submodules of the Query Formulation and Database Interaction Module (402), as depicted in FIG. 4A, in accordance with one or more exemplary embodiments.

Referring to FIG. 4B, it is a block diagram illustrating the detailed submodules of the Query Formulation and Database Interaction Module (402), as depicted in FIG. 4A, in accordance with one or more exemplary embodiments. The Query Formulation and Database Interaction Module (402) may be responsible for converting the structured query into a format compatible with the database and executing the query to retrieve relevant data. As shown in the overall image (400B), this module may include two key submodules: the Schema Mapping Component (406) and the Query Execution Component (408).

The Schema Mapping Component (406) may align the structured query with the database's schema requirements. This process may involve analyzing the database structure, mapping query elements to corresponding database fields, and ensuring that the query adheres to the database's format and constraints. By performing schema mapping, this component may enable seamless communication between the query processing engine and the database. The Query Execution Component (408) may execute the schema-compliant query within the database to retrieve the required data. This component may handle interactions with the database, initiate query execution, and ensure the efficient retrieval of relevant firmographic data. Additionally, the Query Execution Component (408) may support error handling and optimize query performance to deliver results promptly.

Together, the submodules of the Query Formulation and Database Interaction Module (402), as depicted in the overall image (400B), may enable the system to translate and execute structured queries effectively, facilitating accurate and efficient retrieval of firmographic information from the database.

Figure 4C:
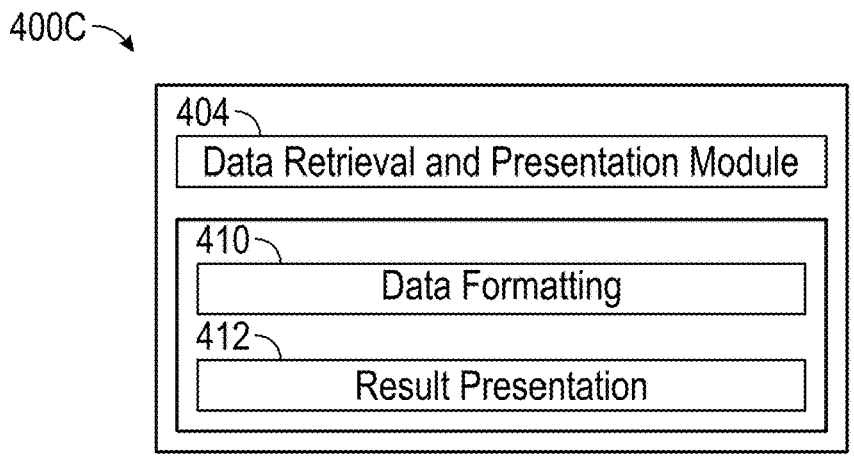
FIG. 4C is a block diagram illustrating the detailed submodules of the Data Retrieval and Presentation Module (404), as depicted in FIG. 4, in accordance with one or more exemplary embodiments.

Referring to FIG. 4C, it is a block diagram illustrating the detailed submodules of the Data Retrieval and Presentation Module (404), as depicted in FIG. 4, in accordance with one or more exemplary embodiments. The Data Retrieval and Presentation Module (404) may be responsible for processing retrieved data to format it appropriately and present it to the user in a clear and accessible manner. As shown in the overall image (400C), this module may include two key submodules: the Data Formatting Component (410) and the Result Presentation Component (412).

The Data Formatting Component (410) may be configured to organize and format the retrieved data into a structured and coherent layout. This process may involve applying predefined formatting rules, such as arranging data into tabular formats, sorting data based on relevance, and ensuring consistency in the display of numeric or categorical information. By formatting the data effectively, this component may enhance the readability and usability of the retrieved information.

The Result Presentation Component (412) may deliver the formatted data to the user in a visually organized and user-friendly interface. This component may support interactive presentation methods, such as expandable tables, graphs, or charts, depending on the type of data retrieved. The Result Presentation Component (412) may also provide options for exporting or sharing the presented results, enabling users to utilize the data for further analysis or reporting purposes. Together, the submodules of the Data Retrieval and Presentation Module (404), as depicted in the overall image (400C), may enable the system to process, format, and present retrieved firmographic data effectively, ensuring a seamless and engaging user experience.

Figure 5:
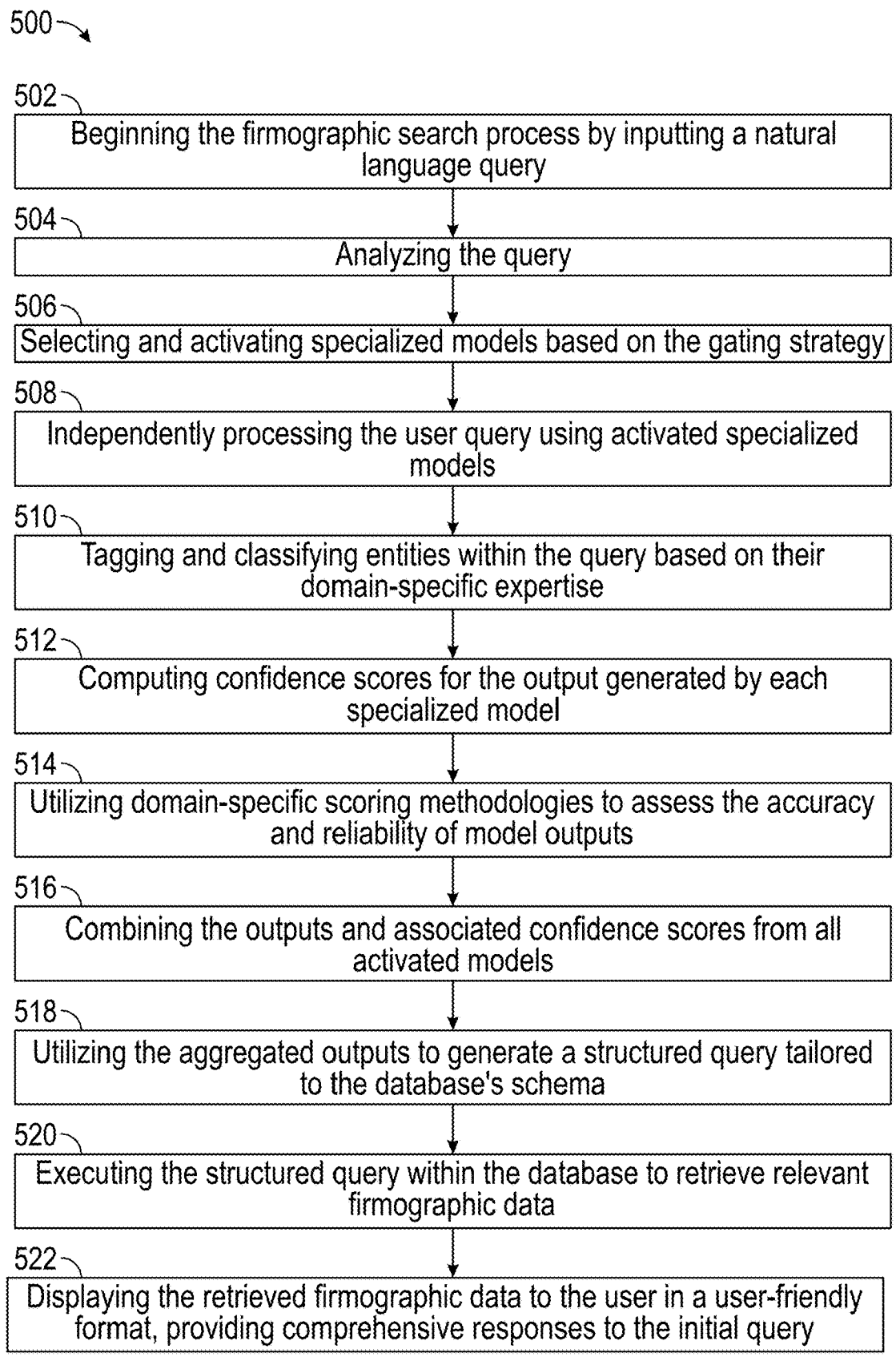
FIG. 5 is a flow diagram that outlines the step-by-step process of enhancing firmographic search through advanced query understanding and expansion, in accordance with one or more exemplary embodiments.

Referring to FIG. 5, a flow diagram 500 may outline the step-by-step process that could be involved in enhancing firmographic search through advanced query understanding and expansion. The process may commence with beginning the firmographic search process by inputting a natural language query 502, where users may initiate their search journey by entering natural language queries. Following this, analyzing the query 504 may take place, where the user's query could undergo a meticulous examination to discern its inherent attributes and context.

Subsequently, the query may move forward to selecting and activating specialized models based on the gating strategy 506. This step may employ a gating strategy, which could involve the decomposition of the query into recognizable tokens, the identification of domain-specific key terms, and the analysis of contextual nuances, among other factors. The gating strategy may play a crucial role in instructing the activation of relevant specialized models. With specialized models activated, the independently processing the user query using activated specialized models 508 stage may commence. Each activated model may operate autonomously, meticulously examining the query. Tagging and classifying entities within the query based on their domain-specific expertise 510 may be one of the core functions performed by these specialized models. They may identify and classify entities, such as organization names, industry types, geographic locations, executive names, and other firmographic attributes, drawing upon their domain-specific expertise.

As the process progresses, the system may undertake computing confidence scores for the output generated by each specialized model 512. These confidence scores may be essential in evaluating the reliability and accuracy of the output generated by each specialized model. Utilizing domain-specific scoring methodologies to assess the accuracy and reliability of model outputs 514, these scores may contribute to a nuanced understanding of the quality of the generated outputs. Moving forward, the system may combine the outputs and associated confidence scores from all activated models 516. This aggregation of outputs and scores may serve as a vital step in generating a refined and structured query, which aligns with the database's schema 518. This structured query may then be employed for executing the structured query within the database to retrieve relevant firmographic data 520.

Finally, the system may undertake the displaying of the retrieved firmographic data to the user in a user-friendly format, providing comprehensive responses to the initial query 522 step. This may ensure that the user receives the desired information in a manner that is intuitive and accessible. Beginning with the user's query input, the step-by-step process may encompass query analysis, model activation, entity tagging, confidence scoring, output aggregation, structured query formulation, database execution, and user-friendly data presentation. This comprehensive approach may potentially significantly enhance the precision and relevance of firmographic search results, contributing to a more intuitive and effective user experience.

Figure 6:
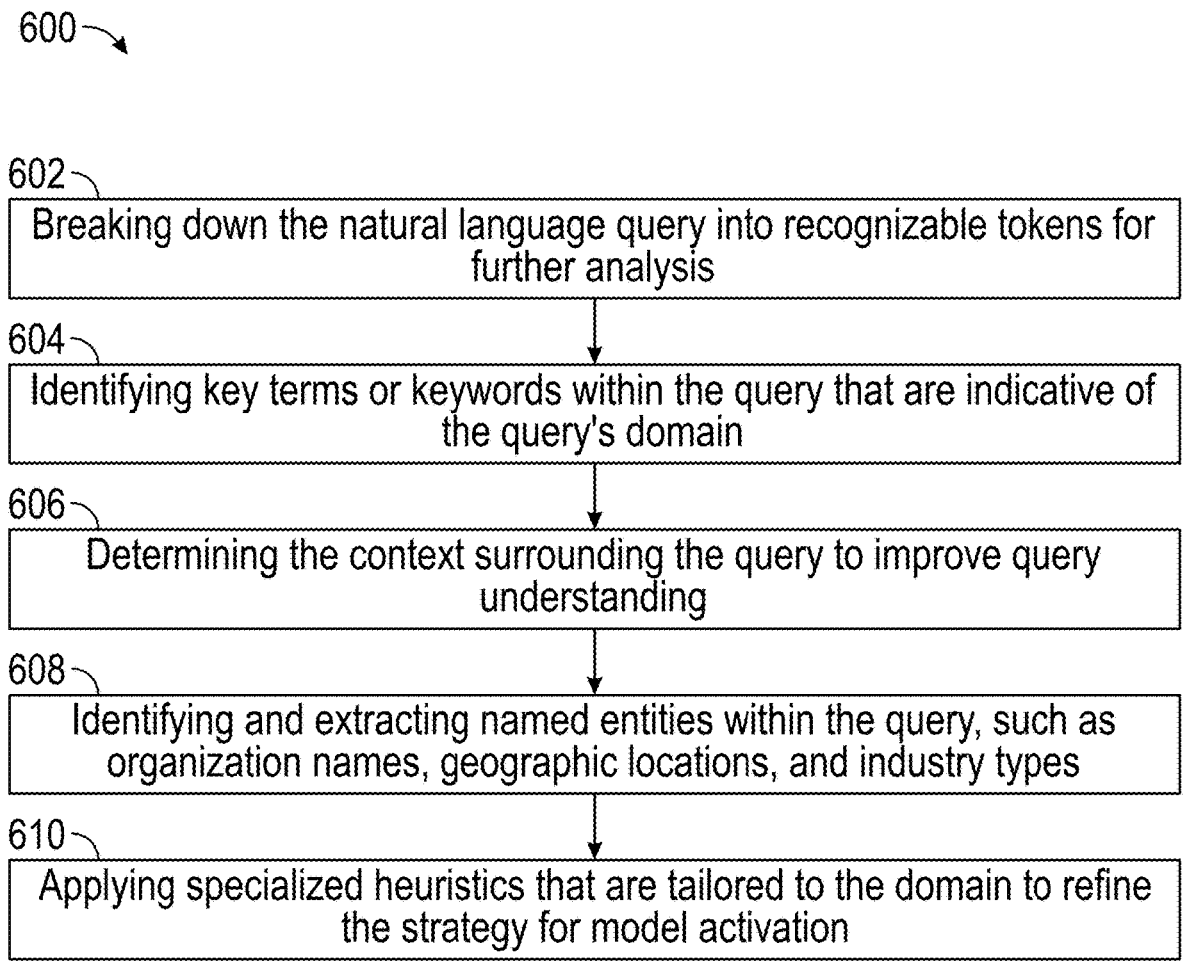
FIG. 6 illustrates a method or process for analyzing the user's query, which is a key step in the overall process of enhancing firmographic search through advanced query understanding and expansion, in accordance with one or more exemplary embodiments.

Referring to FIG. 6, illustrates a method or process that may be employed for analyzing the user's query, a pivotal step in the overall process that may contribute to enhancing firmographic search through advanced query understanding and expansion. This method involves a series of steps that, when executed, may contribute to a comprehensive understanding of the user's query and its context. The process may commence with breaking down the natural language query into recognizable tokens for further analysis 602. This initial step may involve dissecting the query into manageable components, which may facilitate subsequent analysis. It is followed by identifying key terms or keywords within the query that are indicative of the query's domain 604. This step may aim to identify specific terms or phrases within the query that may provide insights into the user's intent and the domain of the search.

Continuing with the analysis, the next step may involve determining the context surrounding the query to improve query understanding 606. Contextual analysis may be employed to better comprehend the user's query by considering the surrounding information and any contextual cues that may influence the interpretation. Moving forward, the process may advance to identifying and extracting named entities within the query 608. This step may focus on recognizing and extracting crucial named entities, such as organization names, geographic locations, and industry types, which may play a vital role in refining the query's understanding. Lastly, applying specialized heuristics tailored to the domain to refine the strategy for model activation 610 becomes a key component of the process. These domain-specific heuristics may enhance the strategy for activating specialized models, ensuring that the most relevant models are engaged based on the unique characteristics of the query.

This method for analyzing the user's query is an integral part of the overall process that may be aimed at enhancing firmographic search through advanced query understanding and expansion. By breaking down the query, identifying key terms, considering context, extracting named entities, and applying specialized heuristics, the system may achieve a deeper understanding of the user's intent and query specifics, potentially contributing to more precise and relevant search results.

Figure 7:
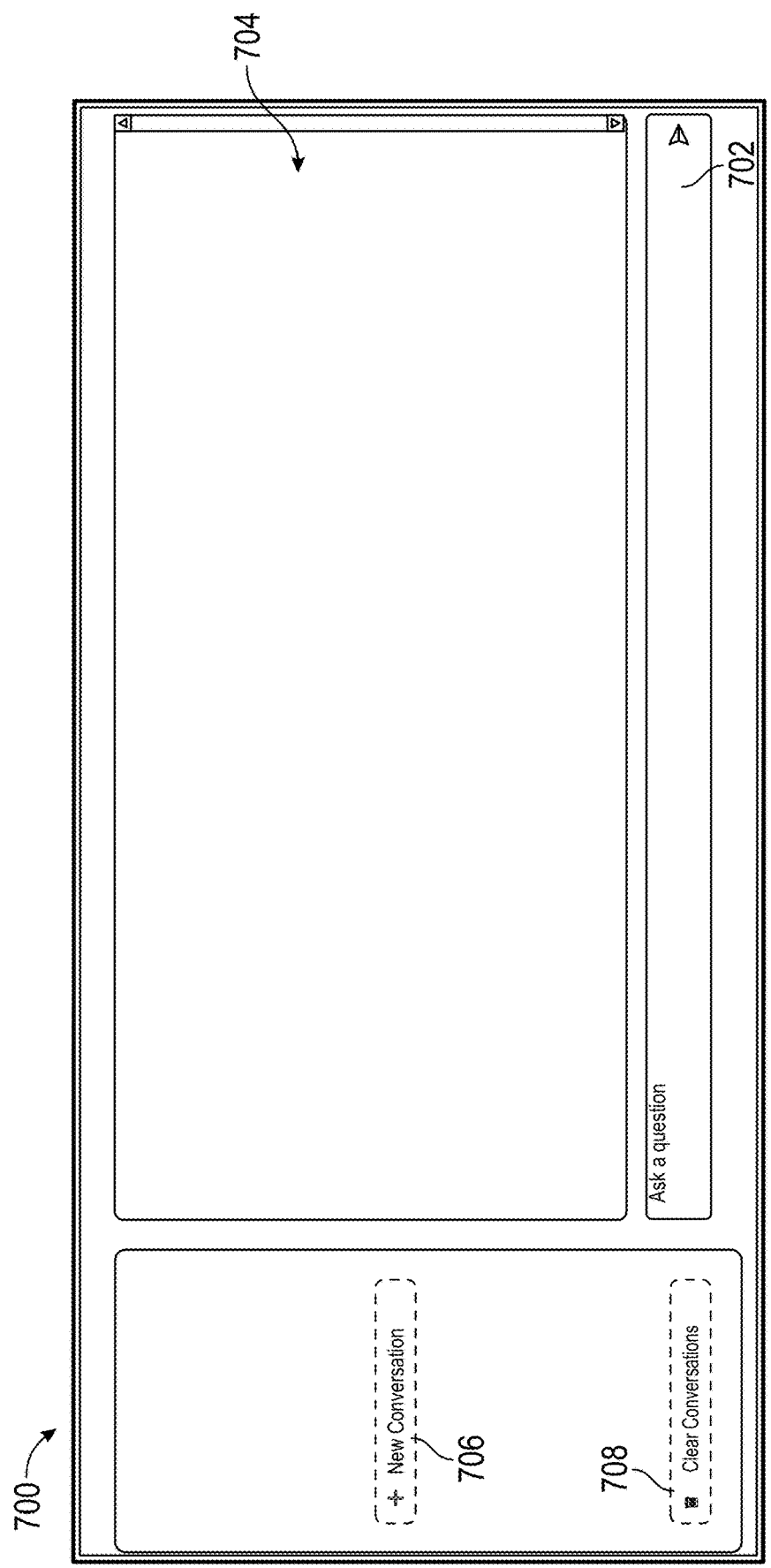
FIG. 7 is a diagram depicting the main screen of the query processing engine application, implemented in accordance with one or more non limiting exemplary functional scenarios.

Referring to FIG. 7 presents a diagram 700 showcasing the primary screen of the query processing engine application, which has been designed and implemented in accordance with one or more non-limiting exemplary functional scenarios. This screen 700 represents the user interface through which users can interact with the query processing engine to perform firmographic searches with ease and efficiency. The main screen prominently features a natural language query input window 702, where users may enter their natural language queries in a free-form manner. This input window serves as the gateway for users to express their information needs, making the search process intuitive and user-friendly.

Adjacent to the query input window is the Output display window 704, where the results of the user's query are presented. This window is designed to display the retrieved firmographic data in a clear and user-friendly format, allowing users to quickly access the information they seek. At the top of the screen, users may find interactive tabs that enhance their experience. The new conversation tab 706 allows users to initiate new queries or conversations with the query processing engine, facilitating continuous interactions and follow-up inquiries. On the other hand, the clear conversation tab 708 provides users with the option to clear the conversation history, offering a fresh start for new queries or discussions.

It's important to note that while this diagram depicts a specific screen layout, the actual appearance and functionality of the query processing engine application may vary based on implementation and user interface design considerations. The presented screen is a representation of the user-friendly interface that may be employed to enhance firmographic search experiences by enabling users to input natural language queries and receive relevant data in an accessible manner.

Figure 8:
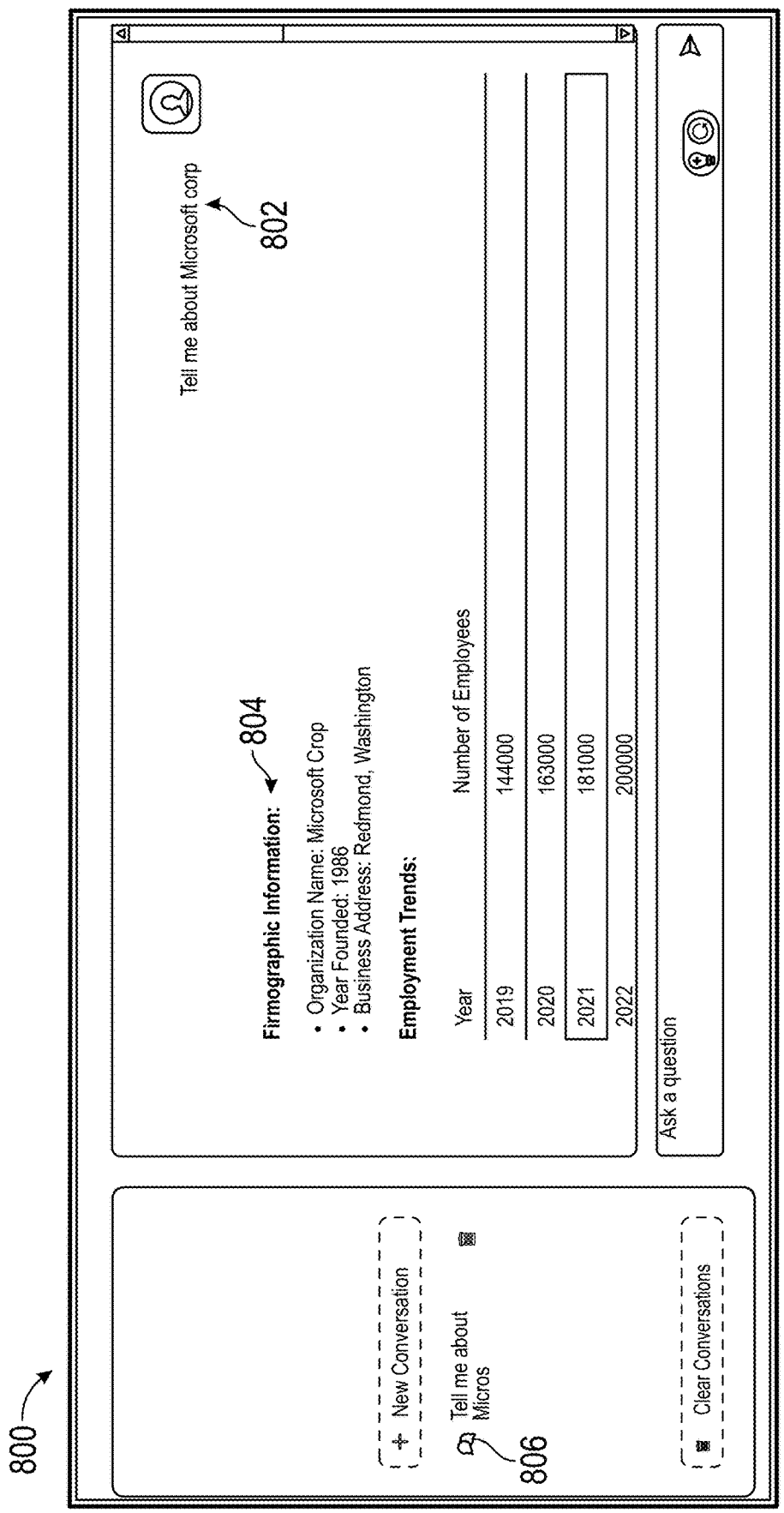
FIG. 8 is a diagram illustrating an additional screen within the query processing engine application. This screen specifically showcases the user's input of a natural language query and the subsequent display of retrieved firmographic data in a user-friendly format, in accordance with one or more exemplary embodiments.

Referring to FIG. 8 provides an illustration of an additional screen within the query processing engine application. This screen 800 is thoughtfully designed to offer users a seamless and intuitive experience when interacting with the application. Specifically, this screen highlights two key elements: the user's input of a natural language query and the subsequent display of retrieved firmographic data in a user-friendly format. At the core of this screen is the natural language input query 802 section, which serves as the primary interface for users to input their firmographic search queries using everyday language. This input method allows users to express their information needs naturally, without the constraints of rigidly structured queries.

The display of firmographic information 804 section plays a pivotal role in presenting the results of the user's query. It showcases the retrieved firmographic data in a format that is accessible and comprehensible to users, enhancing their ability to quickly access the desired information. The user-friendly format may include organized tables, charts, or visual representations, making it easy for users to interpret and utilize the data effectively. To enhance the user's experience, the application may include a query history 806 feature. This section may display a log of previous queries or interactions, enabling users to revisit past searches or continue ongoing conversations with the query processing engine. Such a feature provides convenience and context for users, ensuring a smoother and more productive interaction.

It's important to note that the depicted screen is an illustrative representation, and the actual design and features of the query processing engine application may vary based on implementation and user interface considerations. Nonetheless, this screen embodies the core principles of user-friendliness and accessibility, allowing users to input natural language queries and access firmographic data in a format that may enhance the overall search experience.

Figure 9:
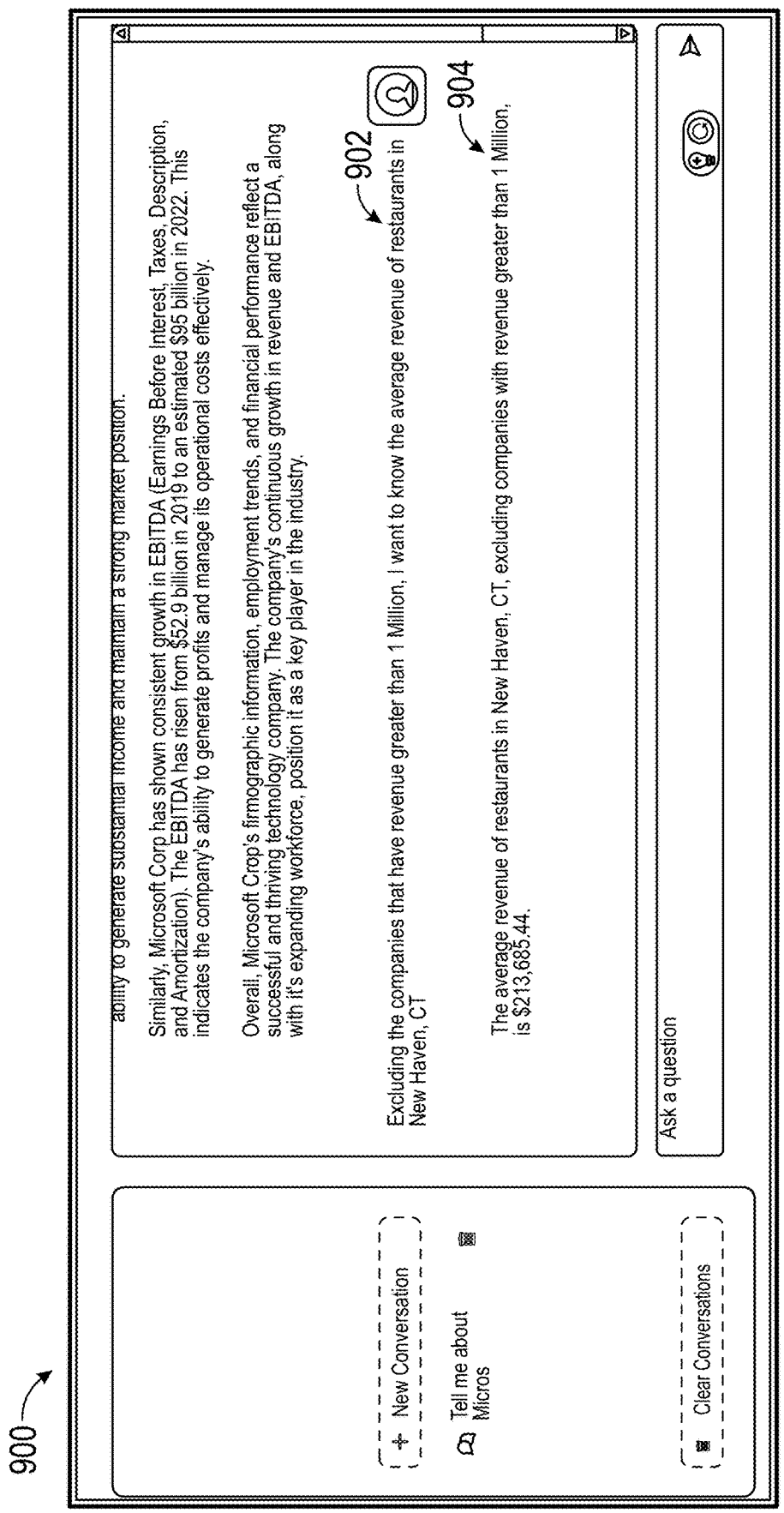
FIG. 9 is a diagram illustrating another exemplary screen within the query processing engine application. This screen specifically showcases the user's input of a natural language query and the subsequent display of retrieved firmographic data in a user-friendly format, in accordance with one or more exemplary embodiments.

Referring to FIG. 9, it illustrates another exemplary screen within the query processing engine application. This screen 900 is purposefully designed to enhance the user's experience when interacting with the application, specifically focusing on the input of a natural language query and the subsequent display of retrieved firmographic data in a user-friendly format. At the forefront of this screen is the natural language input query 902 section, which serves as the primary interface for users to input their firmographic search queries using everyday language. This intuitive input method allows users to articulate their information needs naturally, without the constraints of structured query formats. Users may enter queries related to businesses, industries, locations, or any other firmographic attributes, making the search process more accessible and user-centric.

The central element of this screen is the firmographic information 904 section, where users can explore the results of their queries. The application may present the retrieved firmographic data in a clear and organized manner, providing users with relevant and actionable insights. The displayed information 904 is thoughtfully formatted to ensure user-friendliness, possibly including tables, charts, or visual representations to enhance data comprehension. The key emphasis of this screen is on presenting the retrieved firmographic data to the user in a user-friendly format 906. The application strives to make the information easily digestible and interpretable, ultimately empowering users to make informed decisions based on the data they access. This user-centric approach is central to the design of the query processing engine application, aiming to provide a seamless and productive firmographic search experience.

It's important to note that the screen depicted in FIG. 9 is an illustrative representation, and the actual design and features of the query processing engine application may vary based on implementation and user interface considerations. However, the principles of user-friendliness and accessibility remain paramount, ensuring that users can effortlessly input natural language queries and access firmographic data in a format that enhances their overall search experience.

Referring to FIG. 10, it is a diagram depicting the main screen of the query processing engine application, illustrating the presentation of firmographic search results, implemented in accordance with one or more non-limiting exemplary functional scenarios. The main screen (1000) may provide a user-friendly interface for submitting queries and displaying the corresponding firmographic search results in an organized manner. This screen may include several key components, such as an exemplary query input field (1002), the query output panel (1004), and the presentation of firmographic search results (1006).

The exemplary query input field (1002) may allow users to input natural language queries related to firmographic data. This field may support free-text input and offer features such as autocomplete or query suggestions to assist users in framing their queries effectively. By enabling the submission of diverse queries, this component may facilitate seamless interaction between the user and the query processing engine. The query output panel (1004) may display a summary of the results retrieved in response to the submitted query. This panel may include key information such as the total number of matching records or entities, a brief description of the query's scope, and additional contextual insights to help users interpret the retrieved data.

The presentation of firmographic search results (1006) may organize and display the retrieved data in a tabular or structured format. This component may present firmographic details such as company names, unique identifiers, revenue figures, and geographic locations. Additionally, it may include features such as sorting, filtering, or pagination to enhance user navigation. The interface may also provide export options, enabling users to download the presented results for offline analysis or integration into external systems. Together, the components of the main screen (1000), as illustrated in FIG. 10, may enhance the user's ability to interact with the query processing engine, ensuring efficient submission of queries and intuitive access to relevant firmographic search results.

Figure 11:
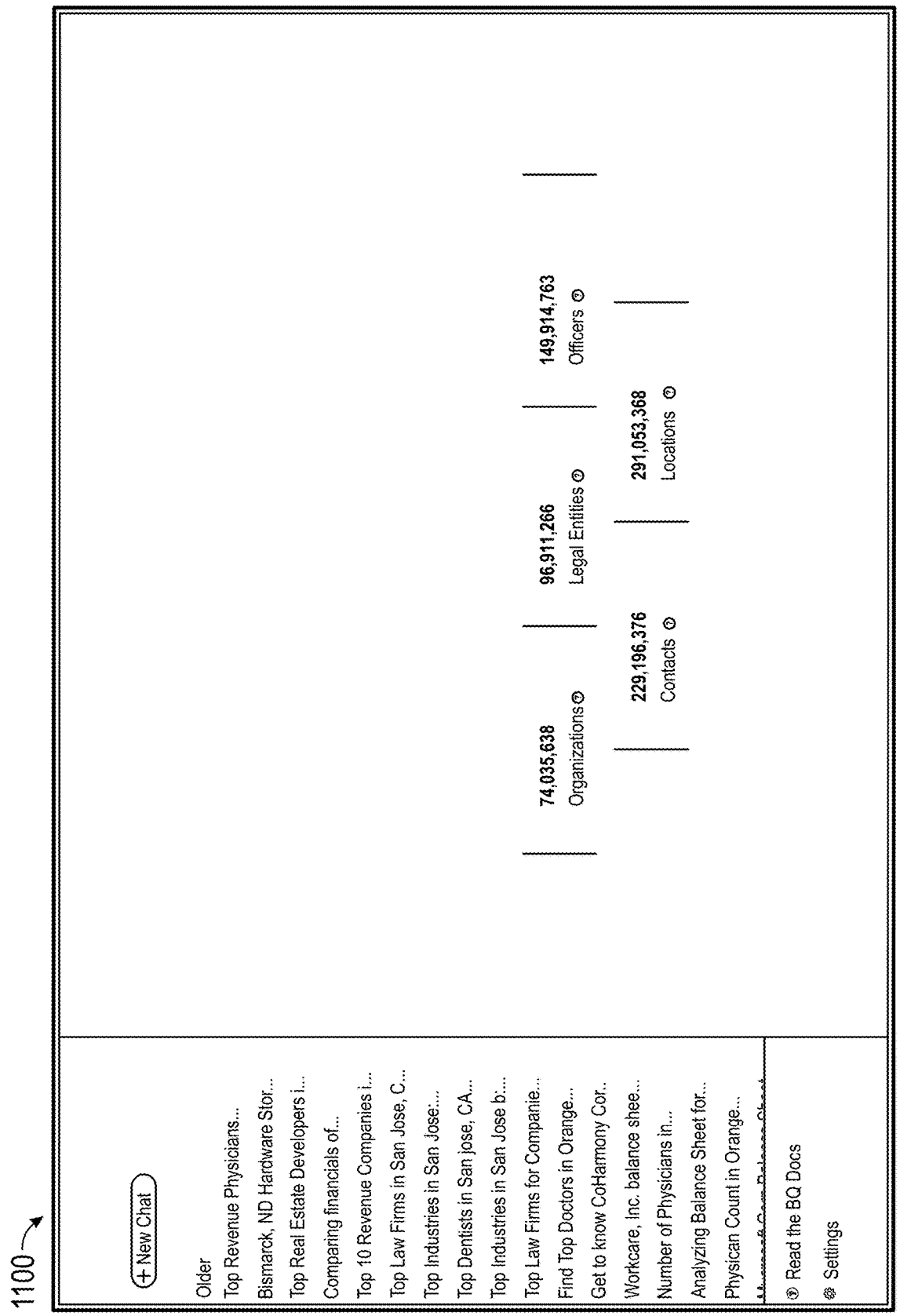
FIG. 11 is a diagram depicting the dashboard screen of the query processing engine application, implemented in accordance with one or more non-limiting exemplary functional scenarios.

Referring to FIG. 11, it is a diagram depicting the dashboard screen of the query processing engine application, implemented in accordance with one or more non-limiting exemplary functional scenarios. The dashboard screen (1100) may serve as a centralized interface, providing users with an overview of key metrics, insights, and navigation options to enhance their interaction with the query processing engine. This screen may be designed to support intuitive access to various features and functionalities. The dashboard screen (1100) may display aggregated data metrics that offer a snapshot of the system's underlying firmographic database. These metrics may include total records of organizations, employees, industry types, geographic locations, and financial attributes, presented in a visually concise manner. The dashboard may also include graphical representations such as bar charts, pie charts, or trend lines to provide additional context and insights into the data.

In addition to displaying metrics, the dashboard (1100) may provide navigation options, enabling users to seamlessly access other functionalities of the query processing engine. These options may include links or tabs to explore previous queries, customize settings, or access help documentation. By incorporating an intuitive navigation layout, the dashboard may allow users to efficiently switch between data exploration, query submission, and result analysis. Together, the features of the dashboard screen (1100), as depicted in FIG. 11, may provide users with a comprehensive overview of the system's capabilities and facilitate seamless navigation, contributing to an enhanced and efficient user experience.

Figure 12:
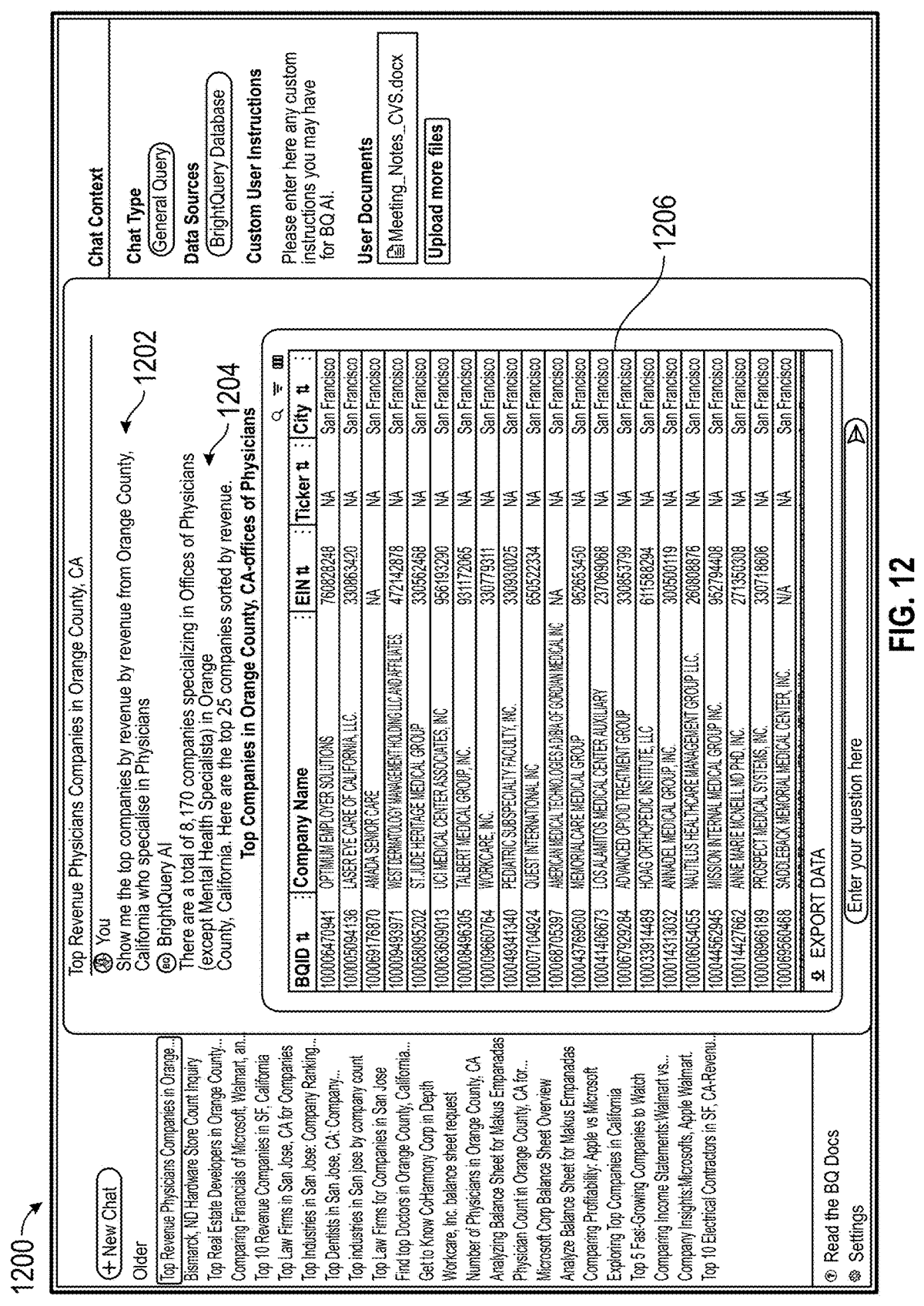

Referring to FIG. 12, it is a diagram depicting the result screen of the query processing engine application, implemented in accordance with one or more non-limiting exemplary functional scenarios. The result screen (1200) may provide users with a detailed view of the query outcomes, showcasing firmographic search results in a structured and user-friendly format. This screen may include an exemplary search query input field (1202), a query output panel (1204), and the presentation of firmographic search results (1206).

The exemplary search query input field (1202) may display the query entered by the user, providing context for the displayed results. This field may allow users to refine or modify the query directly from the result screen, enabling dynamic interactions and iterative search processes. By providing visibility into the active query, this component may enhance the user's understanding of the search scope. The query output panel (1204) may summarize key attributes of the search results, such as the number of matching records, data categories retrieved, and any filters applied to the search. This panel may offer users a concise overview of the results, helping them quickly assess the relevance and completeness of the retrieved information.

The firmographic search results (1206) may present the retrieved data in a structured format, such as a table or grid, containing attributes like organization names, industry classifications, geographic locations, revenue figures, and other firmographic details. This component may include features such as sortable columns, pagination, and interactive filters to enable users to navigate and explore the data efficiently. Additionally, options for exporting the results in various formats may be provided, allowing users to analyze the data further or integrate it into external workflows. Together, the components of the result screen (1200), as depicted in FIG. 12, may enable users to view, interact with, and refine firmographic search results effectively, enhancing the system's utility and user experience.

Figure 13:
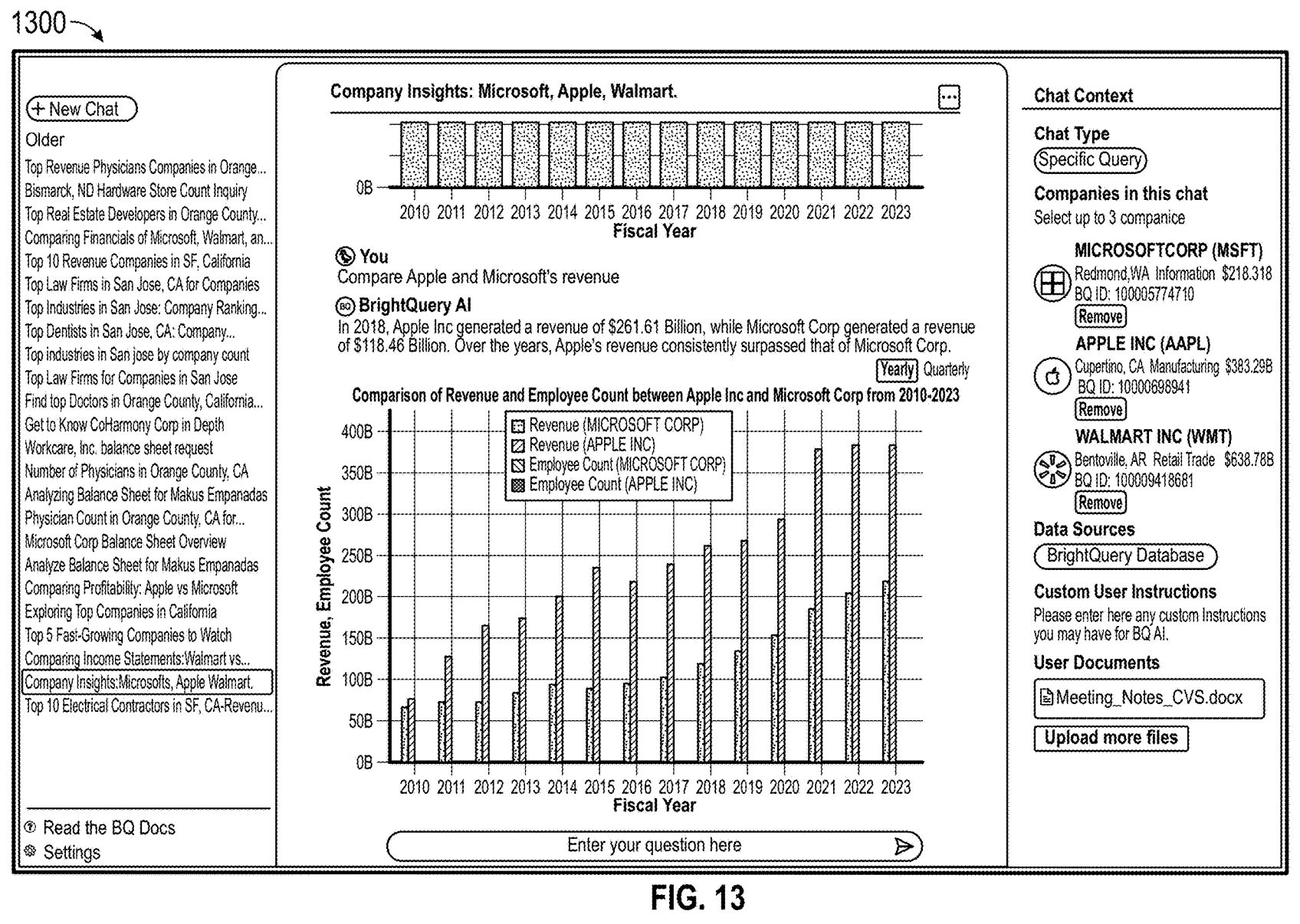

Referring to FIG. 13, it is a diagram depicting the insights screen of the query processing engine application, implemented in accordance with one or more non-limiting exemplary functional scenarios. The insights screen (1300) may serve as a comprehensive interface for presenting analytical insights derived from firmographic data. This screen may provide users with a visually organized view of key trends, comparative analyses, and actionable information.

The insights screen (1300) may include components designed to highlight significant patterns and relationships within the retrieved data. These components may use visual elements such as charts, graphs, or tables to convey information clearly and effectively. For example, the screen may display bar graphs or line charts depicting revenue trends, employee growth, or market share comparisons across multiple organizations or industries. Such visualizations may enable users to quickly interpret data and identify meaningful insights. Additionally, the insights screen (1300) may offer filtering and customization options, allowing users to tailor the displayed information to their specific needs. Filters may include attributes such as time periods, geographic locations, or industry sectors. By enabling users to refine the scope of the insights, the screen may enhance the relevance and utility of the presented information.

The insights screen (1300) may also provide an interactive interface for exploring the underlying data. Users may click on specific visual elements to access detailed information or drill down into finer data points. This feature may facilitate deeper analysis and understanding, empowering users to make informed decisions based on the presented insights. Together, the components of the insights screen (1300), as depicted in FIG. 13, may enhance the query processing engine's ability to provide meaningful and actionable firmographic insights, contributing to a more intuitive and effective user experience.

Figure 14:
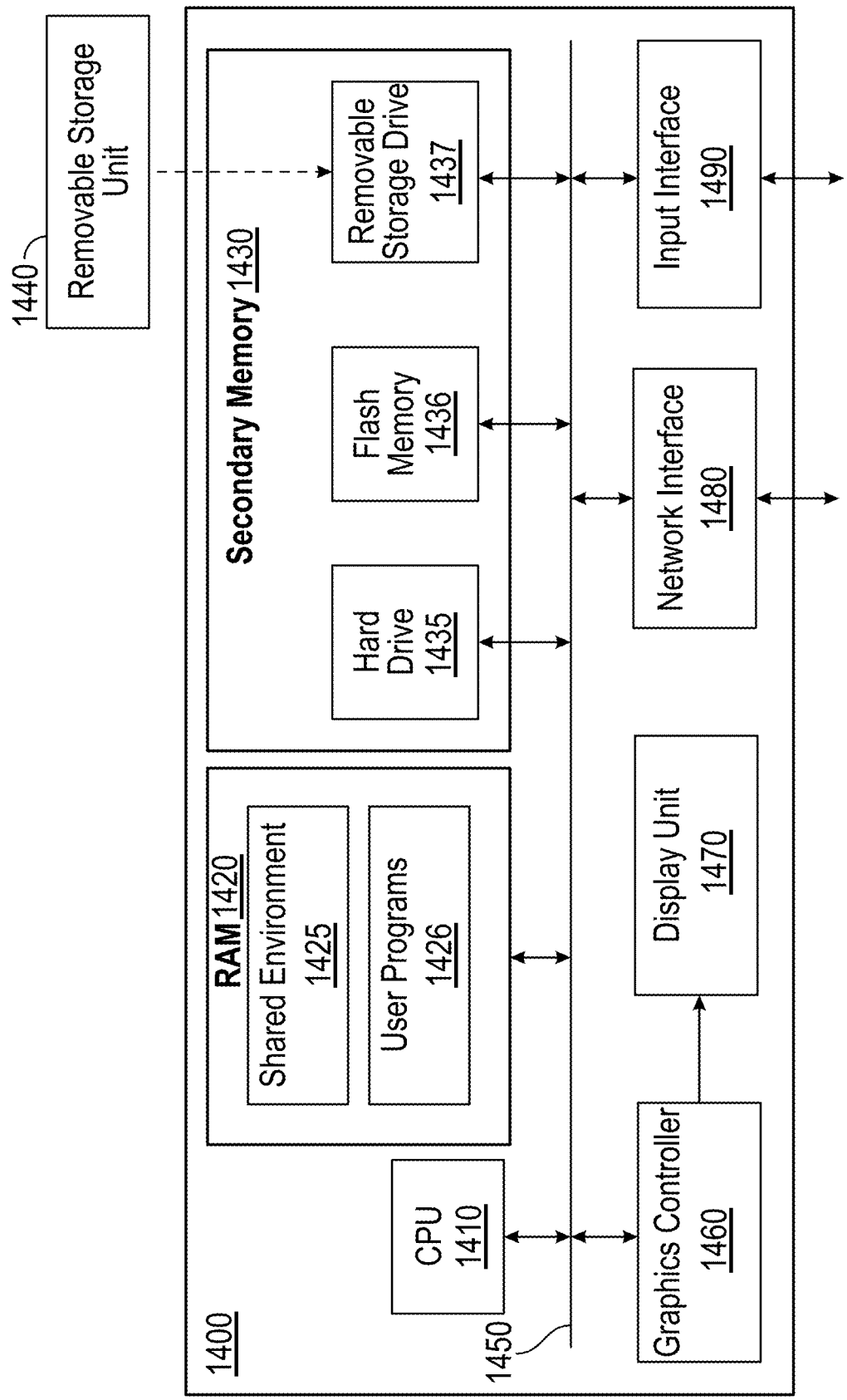
FIG. 14 is a block diagram illustrating the details of a digital processing system in which various aspects of the present disclosure are operative by execution of appropriate software instructions.

Referring to FIG. 14 is a block diagram 1400 illustrating the details of a digital processing system 1400 in which various aspects of the present disclosure are operative by execution of appropriate software instructions. The Digital processing system 1400 may correspond to the computing device (or any other system in which the various features disclosed above can be implemented).

Digital processing system 1400 may contain one or more processors such as a central processing unit (CPU) 1410, random access memory (RAM) 1420, secondary memory 1430, graphics controller 1460, display unit 1470, network interface 1480, and input interface 1490. All the components except display unit 1470 may communicate with each other over communication path 1450, which may contain several buses as is well known in the relevant arts. The components of FIG. 14 are described below in further detail.

CPU 1410 may execute instructions stored in RAM 1420 to provide several features of the present disclosure. CPU 1410 may contain multiple processing units, with each processing unit potentially being designed for a specific task. Alternatively, CPU 1410 may contain only a single general-purpose processing unit.

RAM 1420 may receive instructions from secondary memory 1030 using communication path 1450. RAM 1420 is shown currently containing software instructions, such as those used in threads and stacks, constituting shared environment 1425 and/or user programs 1426. Shared environment 1425 includes operating systems, device drivers, virtual machines, etc., which provide a (common) run time environment for execution of user programs 1426.

Graphics controller 1460 generates display signals (e.g., in RGB format) to display unit 1470 based on data/instructions received from CPU 1410. Display unit 1470 contains a display screen to display the images defined by the display signals. Input interface 1490 may correspond to a keyboard and a pointing device (e.g., touchpad, mouse) and may be used to provide inputs. Network interface 1480 provides connectivity to a network (e.g., using Internet Protocol), and may be used to communicate with other systems (such as those shown in FIG. 1) connected to the network.

Secondary memory 1430 may contain hard drive 1435, flash memory 1436, and removable storage drive 1437. Secondary memory 1430 may store the data software instructions (e.g., for performing the actions noted above with respect to the Figures), which enable digital processing system 1000 to provide several features in accordance with the present disclosure.

Some or all of the data and instructions may be provided on removable storage unit 1440, and the data and instructions may be read and provided by removable storage drive 1437 to CPU 1410. Floppy drive, magnetic tape drive, CD-ROM drive, DVD Drive, Flash memory, removable memory chip (PCMCIA Card, EEPROM) are examples of such removable storage drive 1437.

Removable storage unit 1440 may be implemented using medium and storage format compatible with removable storage drive 1437 such that removable storage drive 1437 can read the data and instructions. Thus, removable storage unit 1440 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1440 or hard disk installed in hard drive 1435. These computer program products are means for providing software to digital processing system 1400. CPU 1410 may retrieve the software instructions and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1430. Volatile media includes dynamic memory, such as RAM 1420. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (communication path) 1450. Transmission media can also take the form of acoustic or light waves, such as those generated during radio-wave and infra-red data communications.

The following examples illustrate various non-limiting exemplary scenarios that demonstrate the functionality and adaptability of the query processing engine across diverse use cases. These examples are provided to explain how the system processes complex natural language queries, leveraging its functional modules and submodules to refine, analyze, and retrieve relevant firmographic search results. Each example highlights specific aspects of the system's capabilities, including multi-level tokenization, query validation, domain-specific filtering, entity categorization, and confidence scoring.

These scenarios showcase how the system handles real-world queries that may include challenges such as insufficient specificity, non-firmographic elements, industry-specific jargon, abbreviations, and complex patterns. By demonstrating the interplay between various modules, such as the Gating Strategy Module, Query Validation Unit, Domain-specific Filtering Unit, and Entity Categorization Unit, the examples provide a comprehensive understanding of the system's versatility in processing diverse query types to deliver precise and meaningful results.

Example 1: Identifying Tech Startups in Silicon Valley Based on Specified Criteria User Question
"Find tech startups in Silicon Valley with >$50 M revenue and 100+ employees founded after 2020."
Scenario Description
When the user submits the above query, the system's Gating Strategy Module (302) processes the question through the Multi-level Tokenization Unit (314), performing a series of tokenization tasks to break down and analyze the query effectively. Each subcomponent of the Multi-level Tokenization Unit plays a specific role in ensuring that the query elements are correctly interpreted for downstream processing:
Word-Level Tokenization Component (314A)
This component identifies individual terms in the query, such as "tech," "startups," "revenue," "employees," and "founded." The word-level tokenization process establishes a foundational understanding of the query by separating meaningful words for further contextual analysis.
Phrase-Level Tokenization Component (314B)
This component identifies compound business terms within the query, such as "Silicon Valley" and "tech startups." By recognizing these multi-word expressions, the Phrase-level Tokenization Component ensures that the query retains its business-specific context and avoids misinterpretation of phrases as individual tokens.
Numeric Tokenization Component (314C)
This component processes numerical values and their associated qualifiers, such as ">$50 M" (revenue), "100+" (employees), and "2020" (year). It interprets numerical standards, identifying comparisons (greater than, plus) and ensuring that these numerical values are preserved for accurate filtering during subsequent analysis.
Outcome
The Multi-level Tokenization Unit (314) produces tokenized outputs that retain the query's structure and meaning, ensuring accurate identification of key terms, business contexts, and numerical criteria. These outputs are then passed to subsequent components, such as the Domain-specific Filtering Unit and Entity Categorization Unit, to refine the query further and prepare it for firmographic search within the database.
Relevance to System Functionality
This example highlights the Multi-level Tokenization Unit's ability to handle complex queries with contextual, numerical, and compound phrase processing. By breaking down the query into structured elements, the system ensures precise and efficient firmographic analysis to deliver relevant search results.

Example 2: Handling Multi-Language Query with Special Characters and Encoding Validation User Question
"¿Cuántas empresas tecnológicas hay en São Paulo con ingresos >$50 M?"
Scenario Description
When the user submits this query, the system's Gating Strategy Module (302) processes the input through the Query Validation Unit (312), which performs multiple validation checks to ensure that the query is properly formatted and relevant for downstream analysis. The submodules of the Query Validation Unit operate as follows:
Language and Encoding Detection Component (312A)
Language Detection: This component identifies that the query is written in Spanish by recognizing linguistic patterns such as "¿Cuántas" (how many) and "ingresos" (income).
Encoding Detection: The component validates the query's character encoding as UTF-8, ensuring compatibility with special characters such as "¿" (inverted question mark), "á" (accented vowel), and "ã" (tilde-accented character in "São").
Length and Complexity Validation Component (312B)
This component evaluates the query's length and structural complexity to ensure it meets processing requirements. The query is confirmed to fall within acceptable limits for tokenization and analysis.
Non-Firmographic Filtering Component (312C)
This component ensures that the query focuses on relevant firmographic elements by filtering out irrelevant terms. In this case, the query passes validation as it focuses on "empresas tecnológicas" (technology companies), income thresholds, and geographic location.
Special Character Handling
The query contains multiple special characters that are handled appropriately:
"¿" (inverted question mark) is preserved for accurate language representation.
"ã" in "São Paulo" is recognized as a critical part of the geographic name.
">" (greater than), "$" (currency symbol), and "M" (magnitude indicator) are interpreted correctly for numerical and financial filtering.
Outcome
The Query Validation Unit (312) ensures that the query is linguistically and structurally valid, retains special characters, and is encoded correctly for further processing by downstream modules. The validated query is passed to the Multi-level Tokenization Unit (314) for decomposition into tokens.
Relevance to System Functionality
This example highlights the robust validation capabilities of the Query Validation Unit, demonstrating its ability to handle multilingual queries with special characters and complex encoding. By performing these validations, the system ensures accurate processing of diverse user inputs, enhancing its usability for global audiences.

Example 3: Handling Insufficiently Specific Queries

User Question
"List all companies."
Scenario Description
When the user submits this query, the system processes it through the Gating Strategy Module (302), specifically utilizing the Query Validation Unit (312) to identify potential issues with the query's specificity. The following steps describe how the system addresses the query:

Language and Encoding Detection Component (312A)
  The query is identified as English and validated for standard character encoding (UTF-8). No special characters or encoding issues are present, allowing the query to pass basic language and format checks.
Length and Complexity Validation Component (312B)
  The query's length and structure are evaluated. While the query meets technical length constraints, it is flagged as overly generic due to the lack of detailed parameters such as filters, metrics, temporal aspects, geographic constraints, or industry specifications.
Non-Firmographic Filtering Component (312C)
  The component confirms that the query contains relevant firmographic terminology, such as "companies." However, the lack of qualifying attributes (e.g., revenue thresholds, locations, or industries) results in the query being flagged as insufficiently specific for generating meaningful results.
System Feedback Mechanism
  Based on the validation results, the system may prompt the user to refine the query. For example, the system might suggest adding filters or constraints by displaying a message such as:
    "Your query is too broad. Please specify additional parameters such as location, industry, or revenue range for more meaningful results."
Outcome
  The Query Validation Unit (312) ensures that the query is appropriately flagged for refinement before proceeding to downstream processing. This prevents the system from returning an overwhelming or irrelevant dataset, optimizing the user experience.
Relevance to System Functionality
  This example demonstrates the Query Validation Unit's ability to identify and handle insufficiently specific queries. By flagging and prompting for refinements, the system ensures that only well-defined queries proceed for firmographic search, maintaining the relevance and accuracy of results.

Example 4: Filtering Out Non-Firmographic Queries

User Question
  "What's the weather like in New York and show me pizza restaurants with good reviews."
Scenario Description
  When the user submits this query, the system processes it through the Gating Strategy Module (302), with specific attention to the Query Validation Unit (312). The system identifies and filters out non-firmographic elements to ensure only relevant parts of the query proceed for further analysis. The following steps outline how the system handles this query:
Language and Encoding Detection Component (312A)
  The query is identified as English and validated for standard UTF-8 encoding. There are no encoding issues or special characters that need handling.
Length and Complexity Validation Component (312B)
  The query's structure is evaluated and determined to be well-formed. However, the query includes multiple unrelated requests, combining weather-related information and restaurant reviews, neither of which aligns with the system's firmographic focus.
Non-Firmographic Filtering Component (312C)
  This component identifies and filters out non-business-related elements of the query. Specifically:
    The phrase "What's the weather like in New York" is flagged as irrelevant to firmographic data.
    "Show me pizza restaurants with good reviews" is partially relevant but lacks firmographic indicators such as revenue, location metrics, or industry-specific classifications.
System Feedback Mechanism
  The system may return a feedback message to the user, such as:
    "Your query contains non-firmographic elements. Please refine your search to focus on specific business metrics or firmographic data, such as company revenue, employee count, or industry classification."
Outcome
  The Query Validation Unit (312) ensures that only queries with firmographic relevance proceed for further processing. This query, lacking firmographic indicators and containing unrelated elements, is flagged and filtered, prompting the user to refine their input.
Relevance to System Functionality
  This example demonstrates the system's ability to filter out queries unrelated to its core firmographic focus. By identifying non-firmographic keywords and elements, the system maintains its relevance and efficiency in handling business-specific data queries.

Example 5: Handling Industry-Specific Queries with Abbreviations and Patterns

User Question
  "Find B2B SaaS cos in APAC region with ARR>2 MM USD, 40% YOY growth, and Series B funding led by PE/VC firms."
Scenario Description
  When the user submits this query, the system processes it through the Gating Strategy Module (302), specifically leveraging the Domain-specific Filtering Unit (316) to analyze and refine the query. The subcomponents of this unit perform the following tasks to ensure accurate interpretation and preparation for downstream processing:
Business Jargon Recognition Component (316A)
  This component identifies industry-specific terminology within the query. For instance:
    "B2B" is recognized as Business-to-Business.
    "SaaS" is interpreted as Software-as-a-Service.
    "ARR" is identified as Annual Recurring Revenue.
    "Series B" refers to a specific stage of funding.
    "PE/VC" is understood as Private Equity or Venture Capital firms.
  By recognizing these terms, the component ensures the query's relevance to the system's firmographic focus.
Abbreviation Expansion Component (316B)
  This component expands shorthand references in the query based on contextual understanding. For example:
    "cos" is expanded to "companies," preserving its contextual meaning.
    "APAC" is expanded to "Asia-Pacific," aligning with the geographic region intended by the user.
  The expansion process ensures that abbreviations are standardized for consistency and effective matching during downstream processing.
Pattern Matching Component (316C)
  This component matches specific patterns in the query to predefined formats for financial, growth, and funding-related data:

">2 MM USD" is identified as a monetary value representing "greater than 2 million US dollars."

"40% YoY growth" is matched to a standard growth rate pattern ("Year-over-Year growth of 40%").

"Series B funding" is matched to a funding stage pattern associated with venture capital-backed companies.

By standardizing these patterns, the system ensures that the query is correctly interpreted for database interaction.

Outcome

The Domain-specific Filtering Unit (316) produces a refined and structured query that retains the user's intent while ensuring compatibility with the system's processing requirements. The outputs are passed to subsequent components, such as the Entity Categorization Unit, to further analyze company-specific attributes and relationships.

Relevance to System Functionality

This example highlights the capabilities of the Domain-specific Filtering Unit in handling queries with complex industry-specific jargon, abbreviations, and patterns. By accurately interpreting these elements, the system ensures precision in identifying relevant firmographic results, enhancing the overall query processing effectiveness.

Example 6: Identifying Similar Companies with Specific Product Offerings and Geographic Criteria User Question "Find companies similar to Salesforce and Oracle that sell CRM and ERP solutions to Fortune 500 manufacturers in Germany with subsidiaries in EMEA."

Scenario Description

When the user submits this query, the system processes it through the Gating Strategy Module (302), leveraging multiple components, including the Entity Categorization Unit (318) and the Relationship Mapping Component (318B), to analyze the query and match its complex criteria. The system performs the following tasks:

Entity Categorization Unit (318)

Classification Component (318A)

The companies "Salesforce" and "Oracle" are categorized as software providers specializing in CRM (Customer Relationship Management) and ERP (Enterprise Resource Planning) solutions.

"CRM" and "ERP solutions" are classified under business software product categories relevant to enterprise management.

Relationship Mapping Component (318B)

Relationships between companies and their target customers are established. For instance:

Salesforce and Oracle are mapped to Fortune 500 manufacturers in Germany.

Subsidiaries are linked geographically to the EMEA (Europe, Middle East, and Africa) region.

The system identifies patterns of similarity by analyzing attributes such as company size, product offerings, and customer demographics.

Confidence Assignment Component (318C)

A confidence score is computed for potential matches based on similarity metrics, including shared industries, geographic presence, and overlapping product lines.

Domain-Specific Filtering Unit (316)

The Business Jargon Recognition Component (316A) identifies terms such as "CRM," "ERP," "Fortune 500," and "EMEA" as industry-specific keywords critical for filtering the query.

The Pattern Matching Component (316C) standardizes geographic criteria ("Germany" and "EMEA") and customer types ("Fortune 500 manufacturers") to ensure compatibility with database attributes.

Query Refinement

The refined query includes structured elements such as:

Industry: CRM and ERP solution providers.

Geographic scope: Companies in Germany with subsidiaries in EMEA.

Customer base: Fortune 500 manufacturers.

Similarity metric: Salesforce and Oracle.

Outcome

The system identifies companies that match the specified attributes, leveraging entity classification, relationship mapping, and confidence scoring to rank the results. The output is passed to downstream modules, including the Compiling Model Outputs Module, to generate structured query results.

Relevance to System Functionality

This example demonstrates the system's ability to handle complex similarity-based queries that require multi-faceted analysis. By categorizing entities, mapping relationships, and applying confidence scoring, the system delivers precise and contextually relevant firmographic search results aligned with the user's intent.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A domain-specific system for enhancing firmographic search through query understanding and expansion, comprising:

A computing device;

A server;

A database;

wherein, the computing device, comprises a query processing engine whereby, the query processing engine is configured to receive natural language queries from users using a user query input module and a user interface, both located within the query processing engine on the computing device;

the server communicatively coupled to the computing device, comprises a server-side query processing engine that is configured to receive the natural language queries from the computing device, the server-side query processing engine comprising:

a gating strategy module, located within the server-side query processing engine, configured to process received queries sequentially through a query validation unit, a multi-level tokenization unit, a domain-specific filtering unit, and an entity categorization unit, whereby the queries are analyzed, decomposed, and filtered into tokens, domain-specific keywords, and named entities, categorizing entities to enhance context understanding for subsequent processing;

a model activation and management module, located on the server, comprising a model selection component configured to identify appropriate models for processing based on query attributes, a model repository component configured to store specialized models, and an activation controller component configured to activate the selected models for query processing;

a model processing module, located on the server, comprising an entity tagging component configured to tag identified entities within the query, a classification component configured to categorize the tagged entities, and a domain rules application component configured to apply domain-specific rules, thereby autonomously tagging and classifying entities within the query to refine relevance and accuracy;

a custom confidence scoring module, located within the server, comprising a scoring algorithm component configured to compute confidence scores for model outputs, a reliability assessment component configured to evaluate the reliability of the outputs, and a confidence metrics component configured to generate metrics for output trustworthiness, thereby assessing the reliability of the outputs;

a compiling model outputs module, located within the server, comprising an output aggregation component configured to collect tagged outputs and confidence scores from activated models, a validation component configured to verify the aggregated outputs, and a query structure formation component configured to formulate a structured query suitable for interaction with the database, thereby ensuring compatibility with the database;

the database, communicatively linked to the server, includes:

a query formulation and database interaction module, located within the database, comprising a schema mapping component configured to align the structured query with the database format and a query execution component configured to execute the aligned query for precise data retrieval;

a data retrieval and presentation module, located within the database, comprising a data formatting component configured to organize retrieved firmographic data and a result presentation component configured to deliver the data in a user-friendly format to the computing device, thereby enabling accessible and comprehensible query results;

whereby, the system enables users to submit natural language queries and receive precise, contextually relevant firmographic search results, thereby enhancing query accuracy and relevance.

2. The system of claim 1, wherein queries are analyzed and decomposed by detecting language and encoding, validating length and complexity, filtering non-firmographic content, and handling special characters within the validated queries, using the query validation unit within the gating strategy module.

3. The system of claim 1, wherein queries are tokenized into word-level, phrase-level, and numeric tokens using the multi-level tokenization unit within the gating strategy module.

4. The system of claim 1, wherein queries are filtered into recognized business jargon, expanded abbreviations, and matched patterns using the domain-specific filtering unit within the gating strategy module.

5. The system of claim 1, wherein queries are categorized into classifications, mapped relationships, and assigned confidence levels using the entity categorization unit within the gating strategy module.

6. The system of claim 1, wherein the query validation unit comprises: a language and encoding detection component configured to identify language parameters and validate character encodings of the query; a length and complexity validation component configured to assess the query's size constraints and structural complexity; and a non-firmographic filtering component configured to identify and filter non-business-related query elements.

7. The system of claim 1, wherein the multi-level tokenization unit comprises: a word-level tokenization component configured to segment basic textual elements; a phrase-level tokenization component configured to identify compound business terms; a numeric tokenization component configured to process numerical data elements; and a special character handling component configured to process business-specific special characters and symbols.

8. The system of claim 1, wherein the domain-specific filtering unit comprises: a business jargon recognition component configured to identify and validate industry-specific terminology; an abbreviation expansion component configured to process and expand business-related abbreviations; and a pattern matching component configured to identify and validate business-specific patterns and formats.

9. The system of claim 1, wherein the entity categorization unit comprises: a classification component configured to assign categories to business entities; a relationship mapping component configured to establish connections between identified entities; and a confidence assignment component configured to compute reliability scores for categorized entities.

10. The system of claim 1, wherein specialized models are selectively activated based on query attributes using an activation controller, and the activated models are stored in a model repository within the model activation and management module.

11. The system of claim 1, wherein entities within the query are tagged and categorized according to domain-specific rules using an entity tagging unit and a classification unit within the model processing module.

12. The system of claim 1, wherein confidence scores are computed for model outputs and evaluated based on domain-specific criteria using a scoring algorithm processor and a confidence assessment unit within the custom confidence scoring module.

13. The system of claim 1, wherein tagged outputs and confidence scores are collected and verified to produce a structured query using an aggregation unit and an output validation unit within the compiling model outputs module.

14. The system of claim 1, wherein structured queries are aligned with the database schema and transmitted for data retrieval using a schema-mapping unit and a database communication interface within the query formulation and database interaction module.

15. The system of claim 1, wherein structured queries are processed to retrieve relevant firmographic data and organized for delivery to the computing device using a data execution unit and a presentation formatting unit within the data retrieval and presentation module.

16. The system of claim 1, wherein the retrieved firmographic search results comprise structured data including organization names, geographic locations, industry classifications, financial performance metrics, employee counts, market trends, executive details, and associated metadata, wherein the results are formatted for user delivery in a visually organized and interactive layout to enhance usability and decision-making.

17. A method for enhancing firmographic search through query understanding and expansion, comprising:
   A computing device;
   A server;
   A database;
wherein the computing device, the server, and the database each comprise a query processing engine, the query processing engine of the computing device including a user query input module and a user interface, the query processing engine of the server including a gating strategy module, a model activation and management module, a model processing module, a custom confidence scoring module, and a compiling model outputs module, and the query processing engine of the database including a query formulation and database interaction module and a data retrieval and presentation module;
   enabling a user to input a natural language query;
   analyzing the query by decomposing it into recognizable tokens and identifying domain-specific keywords and phrases indicative of the query's subject;
   determining the context surrounding the query to improve understanding of the user's intent;
   identifying and extracting named entities within the query, including organization names, geographic locations, and industry types;
   applying domain-specific heuristics to refine the strategy for model activation based on the query attributes;
   selecting and activating specialized models tailored to identified attributes within the query;
   processing the query independently with each activated specialized model;
   tagging and classifying entities within the query based on their domain-specific characteristics;
   computing confidence scores for outputs generated by each specialized model to assess their reliability;
   aggregating outputs and associated confidence scores from all activated models;
   generating a structured query based on the aggregated outputs, aligning it with the database schema requirements;
   executing the structured query within a database to retrieve relevant firmographic data; and
   displaying the retrieved firmographic data to the user in a user-friendly format, thereby providing comprehensive and contextually relevant responses to the initial query.

18. A computer program product comprising a non-transitory computer-readable medium having a computer-readable program code embodied therein to be executed by one or more processors, the program code including instructions to:
   enabling a user to input a natural language query;
   analyzing the query by decomposing it into recognizable tokens and identifying domain-specific keywords and phrases indicative of the query's subject;
   determining the context surrounding the query to improve understanding of the user's intent;
   identifying and extracting named entities within the query, including organization names, geographic locations, and industry types;
   applying domain-specific heuristics to refine the strategy for model activation based on the query attributes;
   selecting and activating specialized models tailored to identified attributes within the query;
   processing the query independently with each activated specialized model;
   tagging and classifying entities within the query based on their domain-specific characteristics;
   computing confidence scores for outputs generated by each specialized model to assess their reliability;
   aggregating outputs and associated confidence scores from all activated models;
   generating a structured query based on the aggregated outputs, aligning it with the database schema requirements;
   executing the structured query within a database to retrieve relevant firmographic data; and
   displaying the retrieved firmographic data to the user in a user-friendly format, thereby providing comprehensive and contextually relevant responses to the initial query.

* * * * *